United States Patent
Koganezawa et al.

[11] Patent Number: 5,781,381
[45] Date of Patent: Jul. 14, 1998

[54] DOUBLE-DRIVING HEAD ACTUATOR

[75] Inventors: Shinji Koganezawa; Yoshifumi Mizoshita, both of Kawasaki, Japan

[73] Assignee: Fujitsu Limited, Kawasaki, Japan

[21] Appl. No.: 728,079

[22] Filed: Oct. 9, 1996

[30] Foreign Application Priority Data

Dec. 4, 1995 [JP] Japan ................................ 7-315671

[51] Int. Cl.⁶ ................................................ G11B 5/55
[52] U.S. Cl. ................................ 360/106; 300/109
[58] Field of Search ........................... 360/106, 104, 360/97.01, 109

[56] References Cited

U.S. PATENT DOCUMENTS

| | | | |
|---|---|---|---|
| 4,814,908 | 3/1989 | Schmitz | 360/109 X |
| 5,189,578 | 2/1993 | Mori et al. | 360/106 |
| 5,440,437 | 8/1995 | Sanada et al. | 360/104 |
| 5,521,778 | 5/1996 | Boutaghou et al. | 360/106 |

FOREIGN PATENT DOCUMENTS

| | | |
|---|---|---|
| 2227886 | 9/1990 | Japan . |
| 369072 | 3/1991 | Japan . |
| 5502737 | 5/1993 | Japan . |

*Primary Examiner*—John H. Wolff
*Attorney, Agent, or Firm*—Greer, Burns & Crain, Ltd.

[57] ABSTRACT

A head actuator in a magnetic disk drive, including an actuator arm rotatably mounted on a base of the magnetic disk drive, a first driving mechanism for rotating the actuator arm, and a load beam for supporting at a front end portion thereof a slider carrying a head. The head actuator further includes a second driving mechanism composed of a leaf spring for elastically connecting a front end portion of the actuator arm and a base end portion of the load beam, and an electromagnetic motor for swinging the load beam with respect to the actuator arm.

33 Claims, 34 Drawing Sheets

FIG. 20
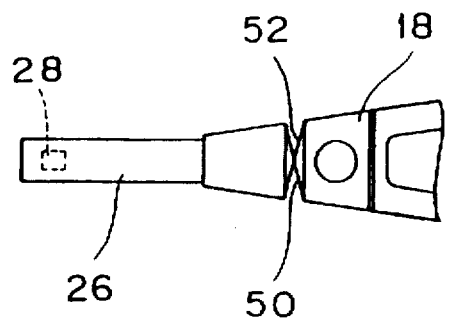
FIG. 21
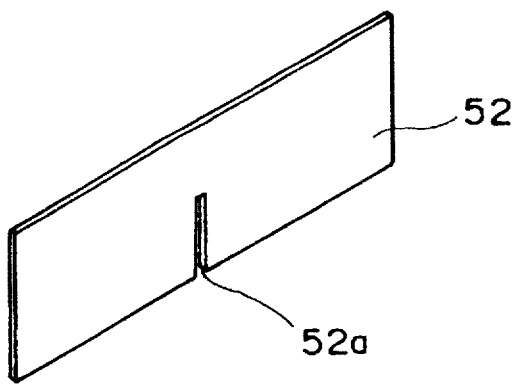
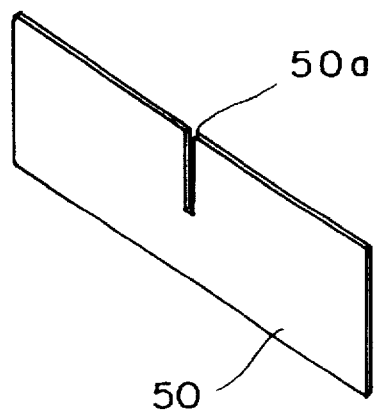

DOUBLE-DRIVING HEAD ACTUATOR

BACKGROUND OF THE INVENTION

1. Field of the Invention

The present invention relates generally to a head actuator in a magnetic disk drive, and more particularly to a double-driving or dual stage head actuator having two driving means.

2. Description of the Related Art

A recent magnetic disk drive as a kind of external storage device for a computer has increasingly been miniaturized and thinned. Further, low power consumption and high-density recording have been desired in the magnetic disk drive. For high-density recording in the magnetic disk drive, it is indispensable to increase the number of tracks per unit length in the magnetic disk drive, that is, to narrow the track pitch. Accordingly, a magnetic head must be positioned above such a narrow track, and it is therefore necessary to improve the head positioning accuracy.

The following items are necessary to improve the head positioning accuracy.

(1) To suppress vibration such as residual vibration of a slider in servo track writing.

(2) To reduce vibration of a spindle motor.

(3) To suppress vibration of a head actuator in head positioning.

(4) To improve a servo bandwidth by improving mechanical resonance frequency.

To suppress vibration of the head actuator as in items (3) and (4), it is effective to increase a resonance frequency in a translational mode of the actuator due to bearing rigidity and a resonance frequency of a structure including an actuator arm and a coil. Further, as means for achieving the items (3) and (4), a double actuator or dual stage actuator is greatly effective. The present invention relates particularly to a tracking actuator in a dual stage actuator.

In a general magnetic disk drive, an actuator arm is rotatably mounted on a base, and a load beam (suspension) is fixed at its base end portion to one end of the actuator arm. A slider carrying a magnetic head is mounted on a front end portion of the load beam. A coil is mounted on the other end of the actuator arm, and a magnetic circuit is fixed to the base of the magnetic disk drive, thus constructing a voice coil motor by the combination of the coil and the magnetic circuit. When the coil is energized, the coil undergoes a force to thereby rotate the actuator arm.

Such a general head actuator has the following problems.

(a) In a head actuator used in a general 2.5-inch or 3.5-inch magnetic disk drive, resonance due to the rigidity of an actuator arm appears at a frequency of 10 kHz or less. It is difficult to greatly increase such a resonance frequency because of various limitations including conditions of a yaw angle and power consumption.

(b) Resonance in a translational mode of the actuator due to bearing rigidity also appears at a frequency of 10 kHz or less, e.g., 4 kHz to 5 kHz. It is also difficult to increase such a resonance frequency because the bearing rigidity cannot be so increased even by a change in pressure applied to the bearing.

Due to the resonances as mentioned in the items (a) and (b) in the conventional general magnetic disk drive, an attainable servo bandwidth is limited to about 1 kHz at most. Accordingly, a tracking error cannot sufficiently be compressed and it is therefore greatly difficult to increase a track density. It has conventionally been proposed to achieve accurate positioning of a head by using a piezoelectric element as a tracking actuator in a so-called dual stage actuator. For example, a pair of piezoelectric elements are located on the opposite sides of an actuator arm, and a voltage is applied to the two piezoelectric elements so that one of the piezoelectric elements expands and the other contracts. Accordingly, the head is rotated in a direction toward the piezoelectric element contracted.

However, in such a conventional actuator using a piezoelectric element, depolarization of the piezoelectric element occurs and causes a gradual decrease in displacement per unit voltage, because of application of a voltage in a direction opposite to a polarization direction of the piezoelectric element, exposure of the piezoelectric element to a high-temperature atmosphere, or aged deterioration, for example. As a result, a desired stroke cannot be obtained after using the actuator for some long period. Further, a high voltage (e.g., about ±30 V) is required to drive the piezoelectric element, so that a circuit for supplying the high voltage is therefore required. In addition, there is a fear that noise due to the driving voltage may come to fall on a signal line. Further, the conventional actuator using a piezoelectric element has other problems of low productivity and high cost. Due to these many problems, the actuator using a piezoelectric element has not yet been put to practical use.

There has also been proposed a head actuator designed to finely move only a slider by using an electromagnetic force. However, the smaller the size of electromagnetic driving means, the smaller the electromagnetic force in general. That is, a large current is required for generation of a driving force so far as the mass of a movable portion is not greatly reduced. Therefore, such a conventional method of driving only the slider is disadvantageous from the viewpoint of power consumption. Further, manufacture of a magnetic circuit is not easy, and there is a fear that noise due to a leakage magnetic flux in driving may come to fall on a signal line, because a magnetic flux generating mechanism is located near a head element (transducer) at a distance of about 1 mm therefrom. Further, the driving force for moving the slider is a magnetic attraction force, so that the driving force is not linear to a current applied to the driving means. Accordingly, head positioning control in a wide movable range is not easy.

As mentioned above, the conventional head actuators include various problems in achieving accurate positioning of the head. Its required to provide a head actuator which can achieve accurate positioning of the head with high reliability and simple structure.

SUMMARY OF THE INVENTION

It is therefore an object of the present invention to provide a head actuator which can achieve an improvement in head positioning accuracy.

It is another object of the present invention to provide a head actuator which can easily control high-accuracy positioning of the head.

In accordance with an aspect of the present invention, there is provided a head actuator in a disk drive having a base, comprising an actuator arm rotatably mounted on the base; a first driving means for rotating the actuator arm; a load beam (suspension) for supporting at a front end portion thereof a slider carrying a head; a connecting means for elastically connecting a front end portion of the actuator arm and a base end portion of the load beam; and a second driving means for swinging the load beam with respect to the actuator arm.

Preferably, the connecting means comprises a spacer fixed to the load beam and a leaf spring fixed to the spacer. The leaf spring comprises a central portion fixed to the actuator arm, a first arm extending from the central portion in a longitudinal direction of the load beam, and a second arm extending from the central portion in a direction perpendicular to the first arm. Preferably, the second driving means comprises a permanent magnet fixed to the actuator arm and a coil mounted on the spacer so as to be opposed to the permanent magnet with a gap defined therebetween. The coil may be mounted on the actuator arm, and the permanent magnet may be fixed to the spacer.

In accordance with another aspect of the present invention, there is provided a head actuator in a disk drive having a base, comprising an actuator arm rotatably mounted on the base; a first driving means for rotating the actuator arm; a load beam for supporting at a front end portion thereof a slider carrying a head, the load beam having an integrally formed, connecting member elastically connected to a front end portion of the actuator arm; and a second driving means for swinging the load beam with respect to the actuator arm.

Preferably, the connecting member comprises a leaf spring comprising a central portion fixed to the actuator arm, a first arm extending from the central portion in a longitudinal direction of the load beam, and a second arm extending from the central portion in a direction perpendicular to the first arm. A plurality of wiring patterns are formed on the load beam, and one end of each wiring pattern is connected to the head.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 20 is a plan view of a seventh preferred embodiment of the present invention;

FIG. 21 is an exploded perspective view of a pair of leaf springs crossed each other;

DETAILED DESCRIPTION OF THE PREFERRED EMBODIMENTS

Figure 1:
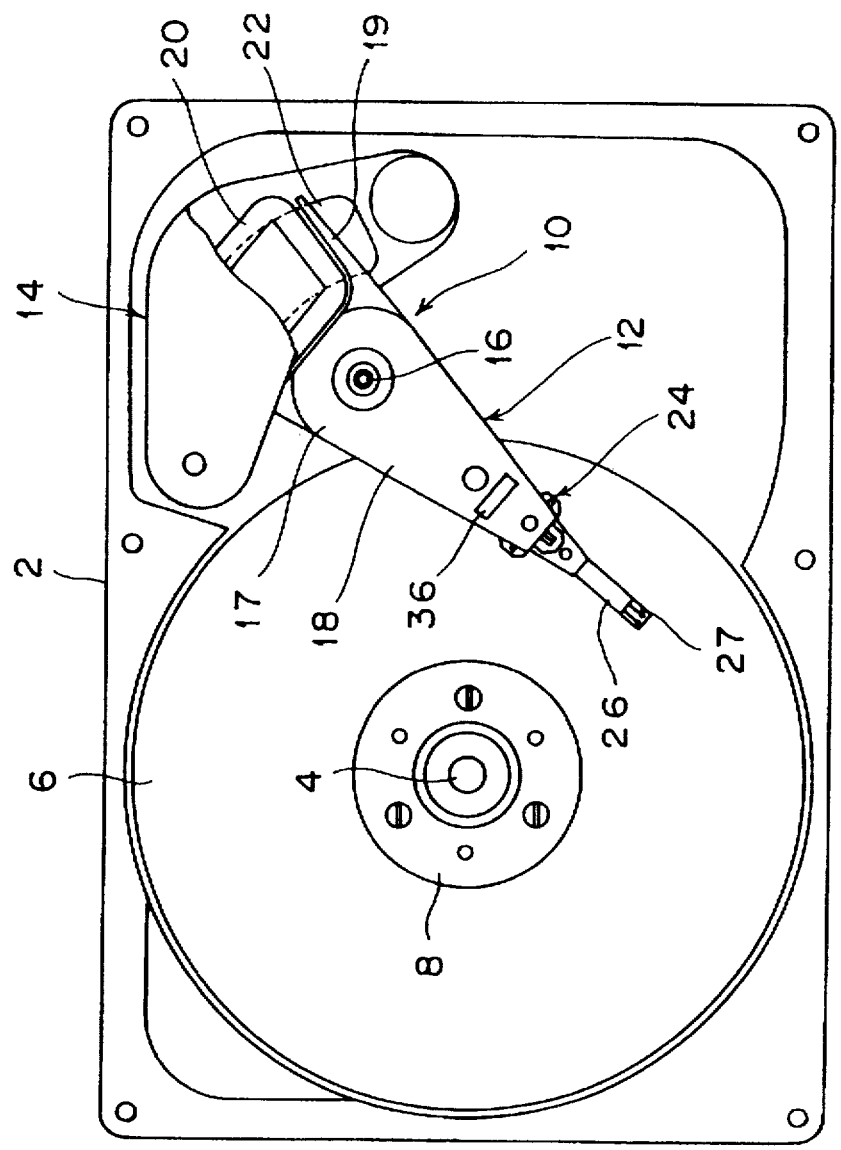
FIG. 1 is a plan view of a magnetic disk drive including a head actuator according to the present invention.

Referring to FIG. 1, there is shown a plan view of a magnetic disk drive including a head actuator according to the present invention. A shaft 4 is fixed to a base 2 of the magnetic disk drive, and a spindle hub (not shown) to be rotated by a spin motor is provided on the outer circumference of the shaft 4. A plurality of magnetic disks 6 and spacers (not shown) are alternately stacked and fitted with the spindle hub, and a disk clamp 8 is fastened to the spindle hub by means of screws, thereby mounting the plural magnetic disks 6 spaced a given distance from each other on the spindle hub.

Reference numeral 10 denotes a rotary head actuator composed of an actuator arm assembly 12 and a magnetic circuit 14. The actuator arm assembly 12 includes an actuator block 17 rotatably mounted through bearings on a shaft 16 fixed to the base 2. The actuator block 17 is integrally formed with a plurality of actuator arms 18 and a coil supporting member 19. The coil supporting member 19 extends opposite to the actuator arms 18 with respect to the shaft 16 as the center of rotation of the actuator block 17. A flat coil 20 is supported to the coil supporting member 19. The magnetic circuit 14 includes a permanent magnet 22.

Figure 3:
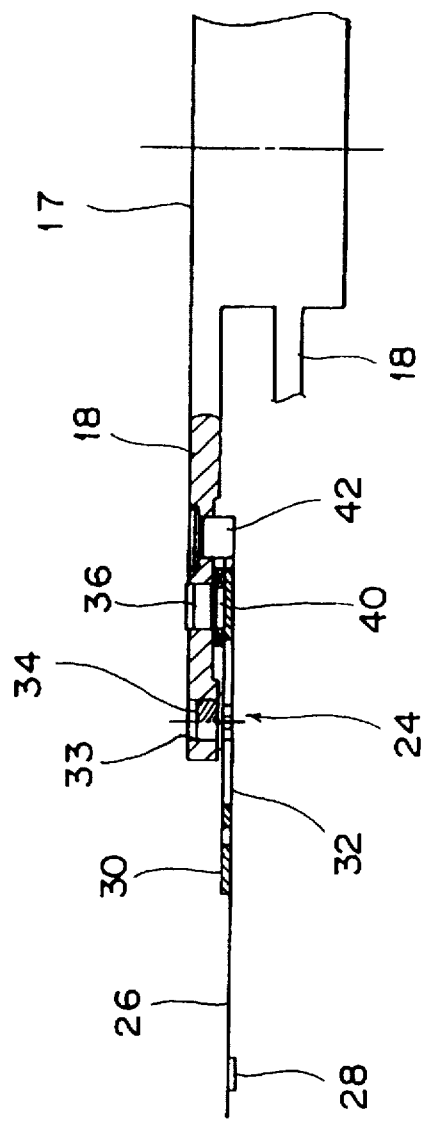
FIG. 3 is a partially sectional, side view of the first preferred embodiment.

A load beam (suspension) 26 is elastically connected at its base end portion to a front end portion of each actuator arm 18 by elastic connecting means 24. A flexure (gimbal) 27 is formed at a front end portion of the load beam 26. As shown in FIG. 3, a slider 28 carrying a magnetic head is mounted on the flexure 27.

Figure 2:
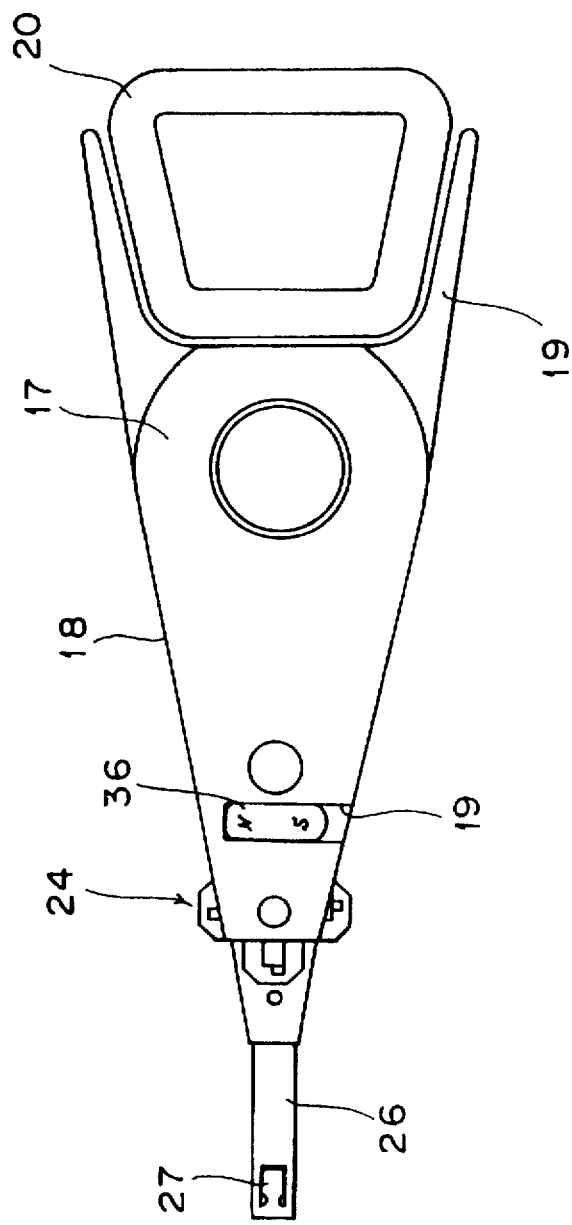
FIG. 2 is a plan view of a first preferred embodiment of the present invention.
Figure 4:
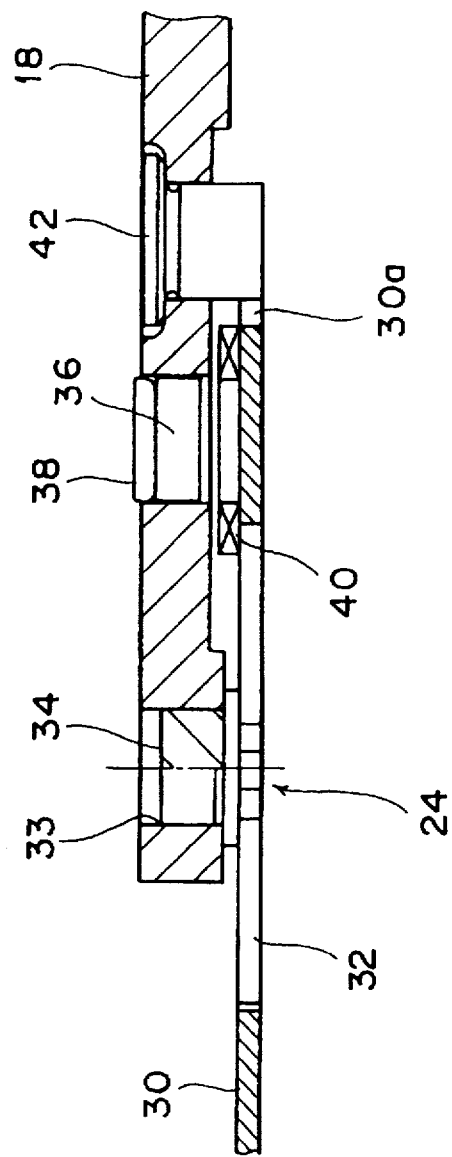
FIG. 4 is an enlarged sectional view of the first preferred embodiment.
Figure 6A:
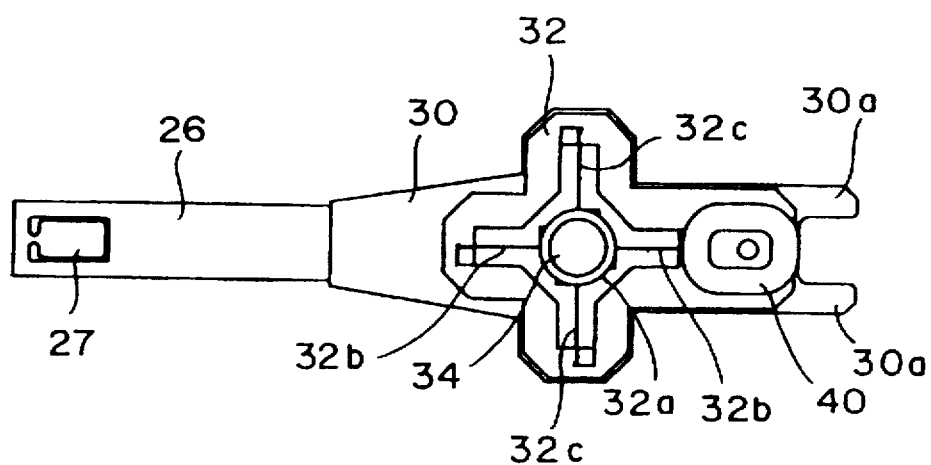
FIG. 6A is a plan view of a load beam assembly.
Figure 6B:
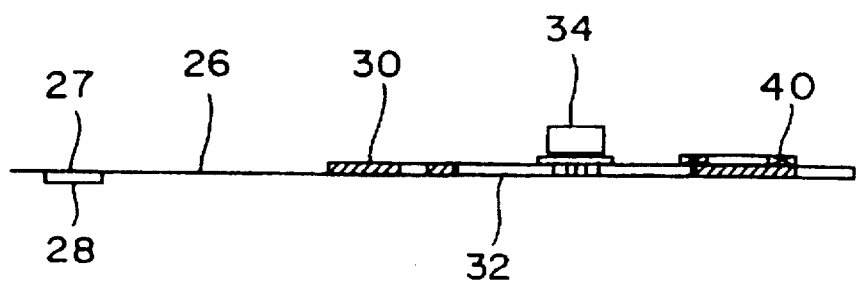
FIG. 6B is a sectional view of the load beam assembly shown in FIG. 6A.

Referring to FIGS. 2 to 4, the elastic connecting means 24 includes a spacer 30 fixed to the front end portion of the load beam 26 and a cross-shaped leaf spring 32 spot-welded to the spacer 30. As best shown in FIG. 6A, the cross-shaped leaf spring 32 includes a central fixed portion 32a, a pair of arms 32b extending from the central fixed portion 32a in a longitudinal direction of the load beam 26, and a pair of arms 32c extending from the central fixed portion 32a in a direction perpendicular to the arms 32b.

Figure 7:
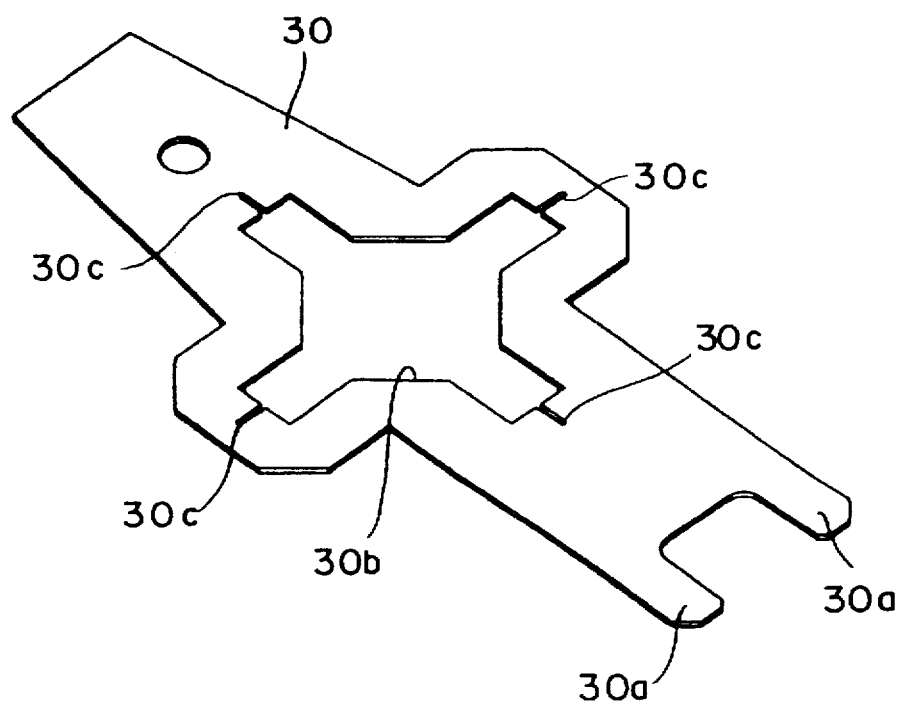
FIG. 7 is a perspective view of a spacer.

The central fixed portion 32a of the cross-shaped leaf spring 32 is spot-welded to a shaft 34. The shaft 34 is inserted and bonded in a hole 33 formed at the front end portion of the actuator arm 18. With this structure, the load beam 26 is elastically mounted through the cross-shaped leaf spring 32 and the spacer 30 to the actuator arm 18. As shown in FIG. 7, a pair of projections 30a functioning as stoppers are formed at one end portion of the spacer 30, and a substantially cross-shaped cutout 30b is formed at a central portion of the spacer 30. Four slits 30c extend radially outward from the four ends of the cutout 30b.

Figure 8:
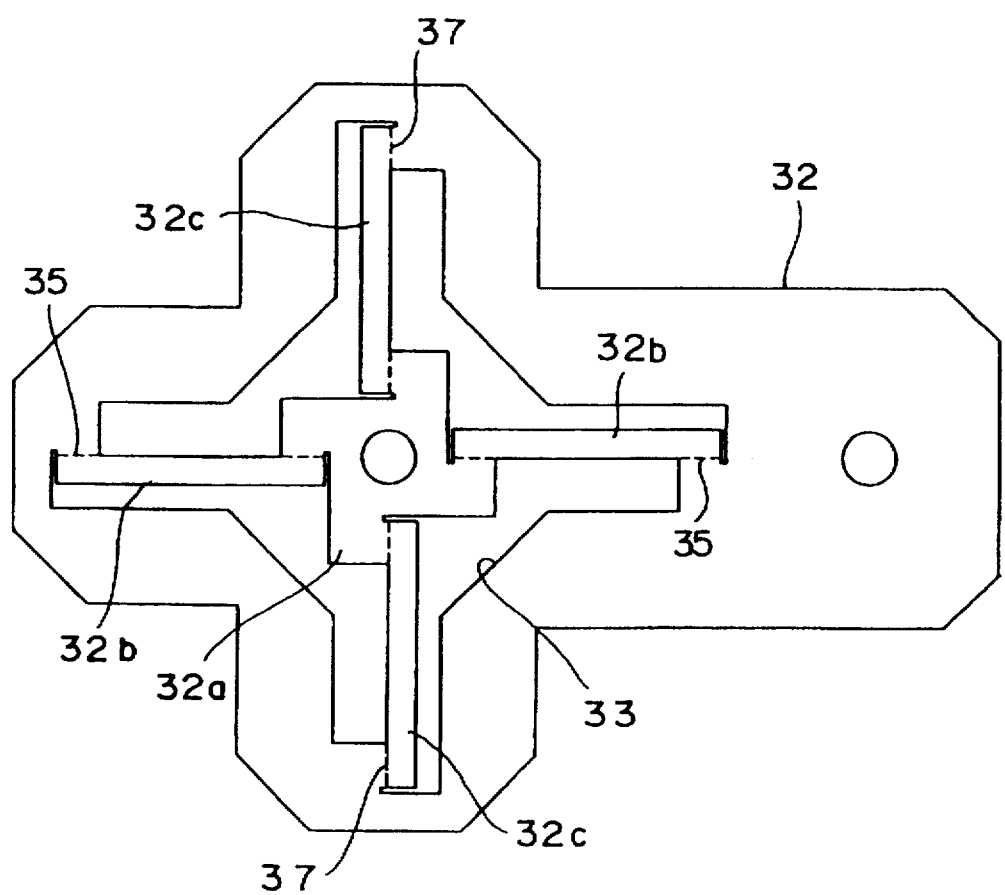
FIG. 8 is a developed plan view of a cross-shaped leaf spring.

Referring to FIG. 8, there is shown a developed plan view of the cross-shaped leaf spring 32. The cross-shaped leaf spring 32 has a cutout 33 having a shape substantially corresponding to the shape of the cutout 30b of the spacer 30. The cross-shaped leaf spring 32 is formed by bending each of the arms 32b and 32c along broken lines 35 and 37 at right angles to the sheet plane of FIG. 8. More specifically, the cross-shaped leaf spring 32 is formed by etching a stainless steel plate into a given shape so as to set the width of each of the arms 32b and 32c to about 0.27 mm. With this configuration, a spring constant of the leaf spring 32 about the axis of the shaft 34 fixed thereto is designed to about $1 \times 10^2$ Nm/rad. The arms 32c of the leaf spring 32 extend in a seek direction, and the arms 32b of the leaf spring 32 extend in a direction perpendicular to the seek direction. Therefore, resonance frequencies both in the seek direction and in a translational mode of the direction perpendicular to the seek direction can be increased. A rotational rigidity of the leaf spring 32 about the axis of the shaft 34 is designed to be low.

Figure 9:
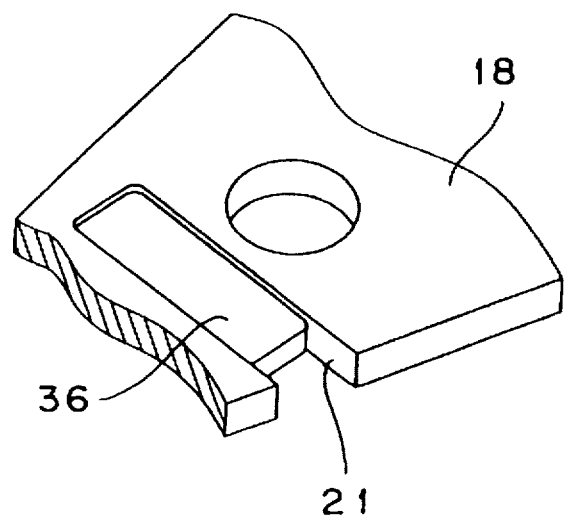
FIG. 9 is an enlarged view of a magnet mounting portion.

As best shown in FIG. 6A, a coil 40 is fixed by bonding or the like on the cross-shaped leaf spring 32. A permanent magnet 36 is mounted in the actuator arm 18 so as to be opposed to the coil 40. The magnet 36 has a thickness of about 0.6 mm, and is magnetized in the thickness direction of the actuator arm 18. Preferably, the magnet 36 is magnetized to have two poles. A yoke 38 is bonded on the permanent magnet 36. As shown in FIG. 9, the magnet 36 is inserted and bonded in a cutout 21 formed in the actuator arm 18. By this fixing method, even in a head actuator having three or more actuator arms, the magnet 36 can be easily fixed to each head actuator arm. The magnet 36 has an energy product of 3 MGOe.

As mentioned above, the pair of projections 30a are formed at one end of the spacer 30. A pin 42 projects from the actuator arm 18 and is located between the two projections 30a of the spacer 30 so that a small gap is defined between the pin 42 and each projection 30a. That is, either projection 30a is adapted to collide with the pin 42, thus functioning as a stopper. Accordingly, it is possible to prevent a possibility that the slider may come away from the corresponding disk or collide with the spindle hub in the event of runaway of the actuator.

The load beam 26, the spacer 30, and the cross-shaped leaf spring 32 constitute a load beam assembly, and the center of rotation of the load beam assembly is so designed as to substantially coincide with the center of gravity of the load beam assembly. Accordingly, it is possible to eliminate the torque of the load beam assembly due to acceleration of the actuator arm 18 in its seek direction or upon collision with the stopper.

Figure 5:
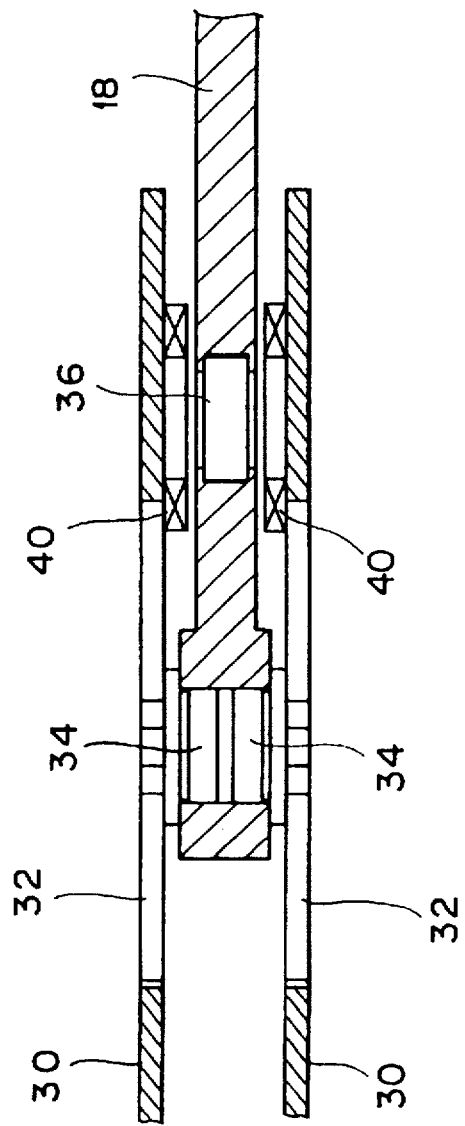
FIG. 5 is an enlarged sectional view of a modification of the first preferred embodiment, wherein two spacers are mounted on an actuator arm.
Figure 10:
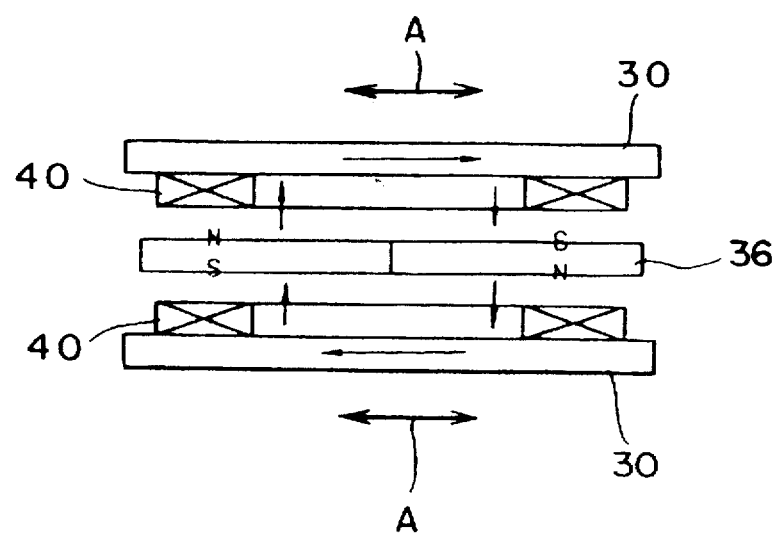
FIG. 10 is a view illustrating the principle of a movable coil type.

Referring to FIG. 5, there is shown a modification employing two spacers 30 and two cross-shaped leaf springs 32 mounted to the front end portion of the actuator arm 18. That is, the two cross-shaped leaf springs 32 are fixed to the upper end and the lower end of the two shafts 34 respectively, and are respectively bonded to the two spacers 30 so that two coils 40 respectively fixed to the two leaf springs 32 are opposed to the magnet 36 mounted in the actuator arm 18. According to the modification shown in FIG. 5, a magnetic circuit as shown in FIG. 10 is formed. When each coil 40 is energized, each spacer 30 is swung in the direction of an arrow A, so that the load beam 26 fixed to each spacer 30 is swung in the same direction.

Figure 11:
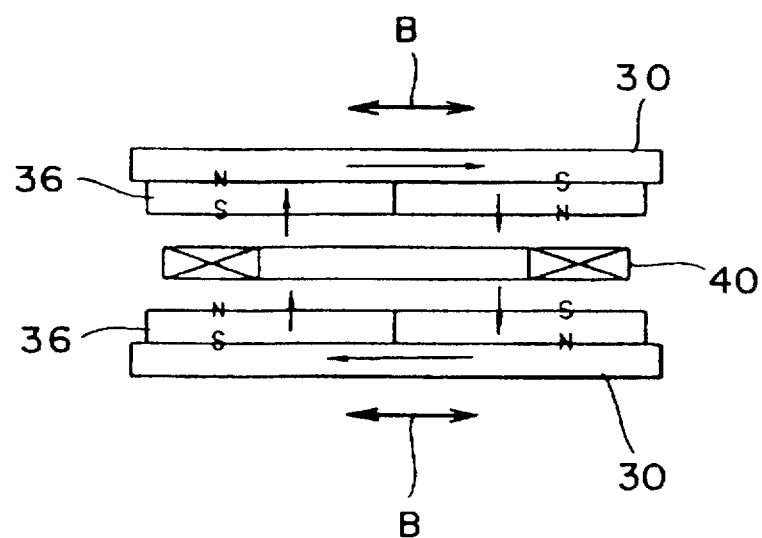
FIG. 11 is a view illustrating the principle of a movable magnet type.

While the first preferred embodiment is of a movable coil type such that the magnet 36 is fixed and the coil 40 is movable, the coil 40 may be mounted to the actuator arm 18 and the magnet 36 may be mounted to the spacer 30. This modification is of a movable magnet type, which forms a magnetic circuit as shown in FIG. 11. In this modification, when the coil 40 is energized, each spacer 30 is swung in the direction of an arrow B. According to this modification, a wiring connected to the coil 40 can be easily routed because the coil 40 is a stator in this case.

Figure 12:
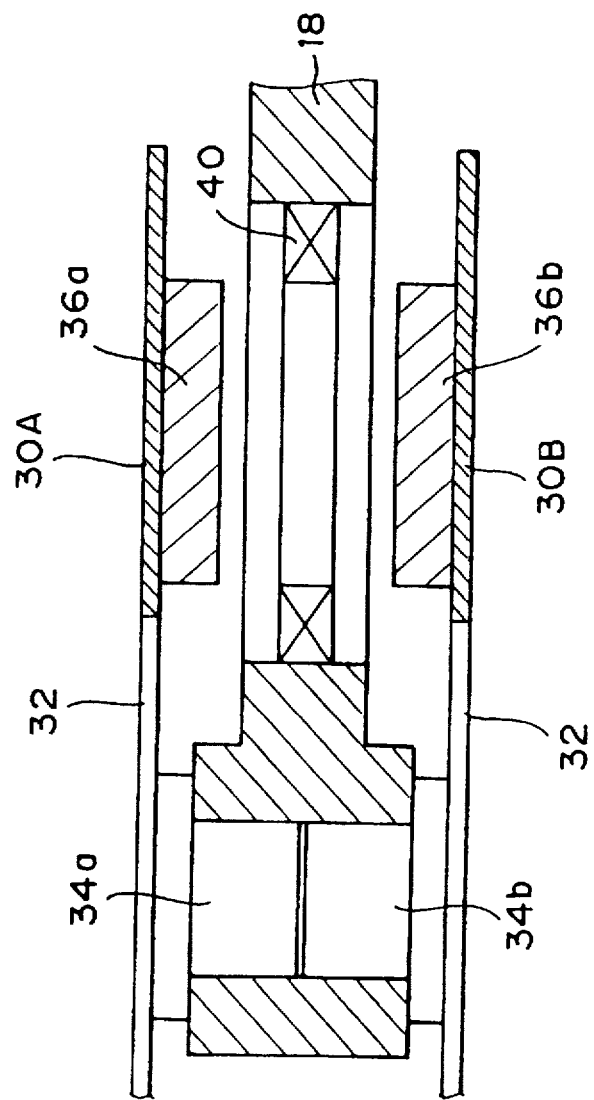
FIG. 12 is a sectional view of a second preferred embodiment of the present invention.

Referring to FIG. 12, there is shown a sectional view of a second preferred embodiment of the present invention. This preferred embodiment is of a movable magnet type. That is, a coil 40 is mounted in the front end portion of the actuator arm 18, and two permanent magnets 36a and 36b are fixed to upper and lower spacers 30A and 30B, respectively, so as to be opposed to the coil 40.

Figure 13:
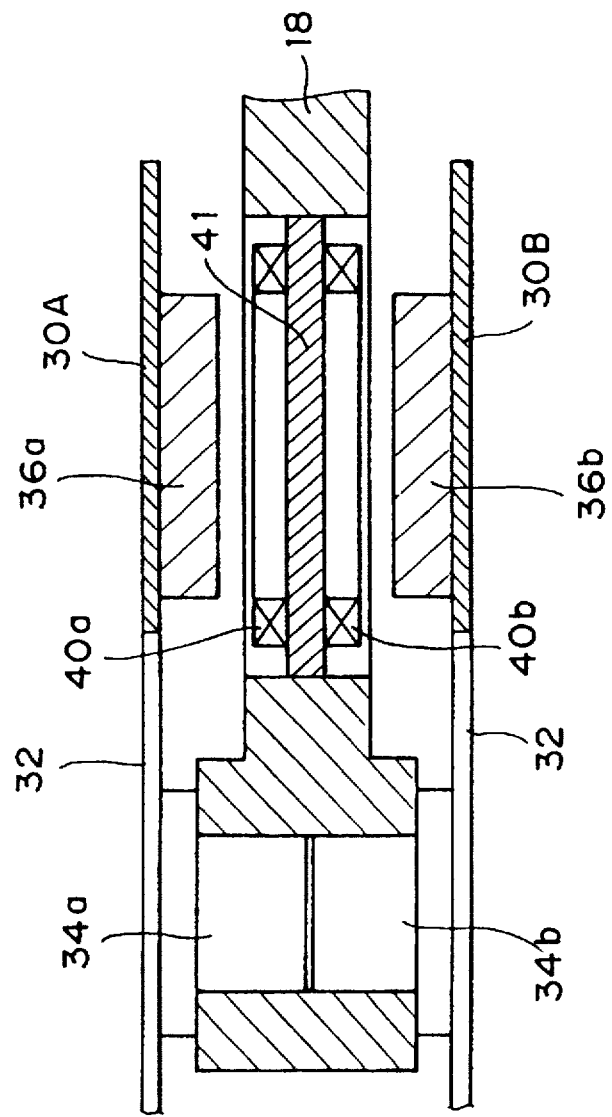
FIG. 13 is a sectional view of a third preferred embodiment of the present invention.

Referring to FIG. 13, there is shown a sectional view of a third preferred embodiment of the present invention. This preferred embodiment is also of a movable magnet type. In this preferred embodiment, a soft magnetic member 41 is fixed in the front end portion of the actuator arm 18, and two coils 40a and 40b are mounted on the upper and lower surfaces of the soft magnetic member 41, respectively. A permanent magnet 36a is mounted on the lower surface of an upper spacer 30A so as to be opposed to the upper coil 40a, and a permanent magnet 36b is mounted on the upper surface of a lower spacer 30B so as to be opposed to the lower coil 40b. When only the upper coil 40a is energized, the upper magnet 36a undergoes a force to swing only the upper spacer 30A about the axis of an upper shaft 34a fixed to the actuator arm 18, whereas when only the lower coil 40b is energized, the lower magnet 36b undergoes a force to swing only the lower spacer 30B about the axis of a lower shaft 34b fixed to the actuator arm 18. Accordingly, upper and lower head sliders respectively connected through upper and lower load beams (suspensions) to the upper and lower spacers 30A and 30B can be swung about the respective axes of the upper and lower shafts 34a and 34b independently of each other.

Figure 14A:
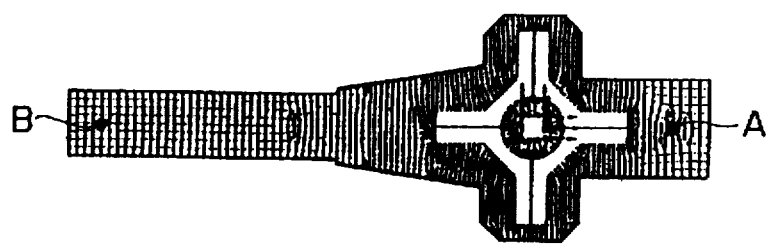
FIGS. 14A, 14B, and 14C are views illustrating a frequency response function indicating displacement of a point B in a seek direction in response to an excitation force applied to a point A.
Figure 14B:
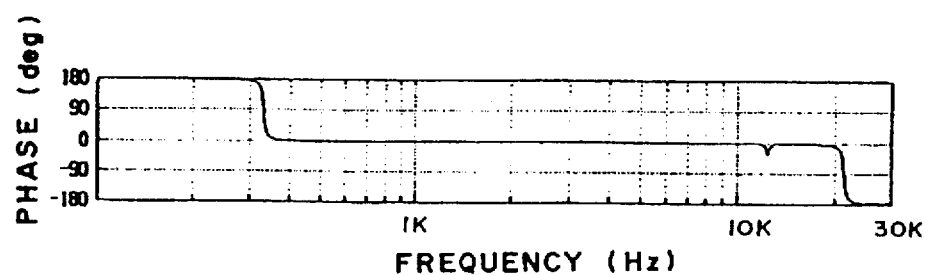
Figure 14C:
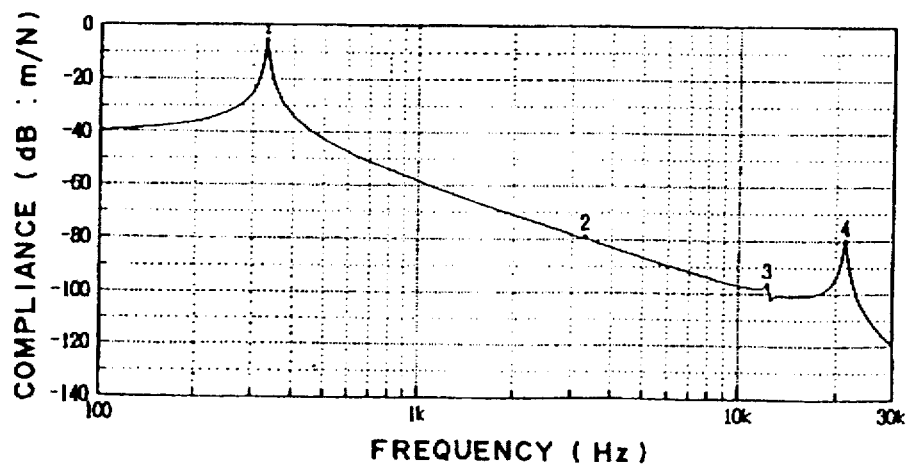

FIGS. 14A to 14C show a result of simulation analysis by a finite element method applied to the first preferred embodiment. In this analysis, the Young's modulus of the load beam 26 is set to a high value, so as to note only the rigidity of the cross-shaped leaf spring 32. FIGS. 14B and 14C show a frequency response function indicating displacement of a point B in a seek direction in response to an excitation force at a point A shown in FIG. 14A. FIG. 14B shows a relation between phase and frequency, and FIG. 14C shows a relation between compliance and frequency.

In this transfer function, a first resonance frequency appears at about 300 Hz, and a dominant resonance appears at more than about 20 kHz. Accordingly, a servo band in this preferred embodiment can be made higher by about three to four times that in the conventional actuator. Preferably, the primary resonance frequency is set to a smaller value, e.g., about 100 Hz. This can be achieved by reducing the thickness of the cross-shaped leaf spring 32 or by increasing the length of each of the arms 32b and 32c. As apparent from the above result of analysis, the first resonance frequency can be low according to the first preferred embodiment. With this design, an excitation force of an electromagnetic motor composed of the magnet and the coil, for swinging a movable portion can be reduced to thereby reduce a power consumption.

Figure 15:
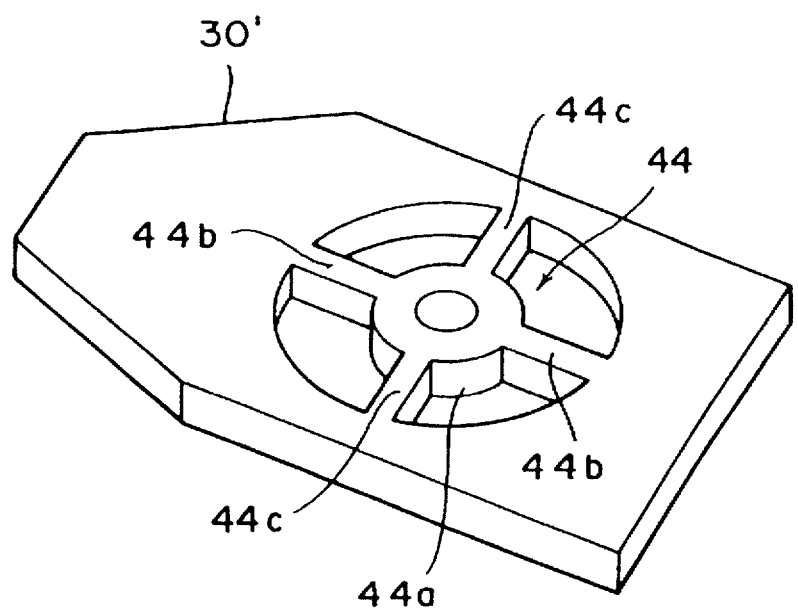
FIG. 15 is a perspective view of a modification of the spacer.

While the cross-shaped leaf spring 32 is spot-welded to the spacer 30 in the first preferred embodiment, the former may be formed integrally with the latter as shown in FIG. 15. Referring to FIG. 15, a spacer 30' is integrally formed with a cross-shaped leaf spring 44. The cross-shaped leaf spring 44 includes a central fixed portion 44a, a pair of arms 44b extending from the central fixed portion 44a in the longitudinal direction of the load beam 26, and a pair of arms 44c extending from the central fixed portion 44a in a direction perpendicular to the arms 44b. By the use of the spacer 30', a primary resonance frequency (in a rotary mode about the center of rotation of the cross-shaped leaf spring 44) can be increased to about 20 kHz.

Figure 16:
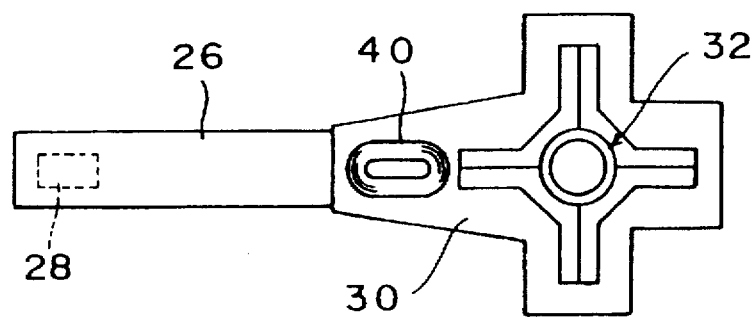
FIG. 16 is a plan view of a fourth preferred embodiment of the present invention.

Referring to FIG. 16, there is shown a plan view of a fourth preferred embodiment of the present invention. In this preferred embodiment, the coil 40 is located on the slider 28 side with respect to the center of rotation of the load beam 26. In this case, a magnet and a yoke must be located so as to be opposed to the coil 40. This preferred embodiment is effective for a reduction in moment of inertia of the load beam assembly.

Figure 17A:
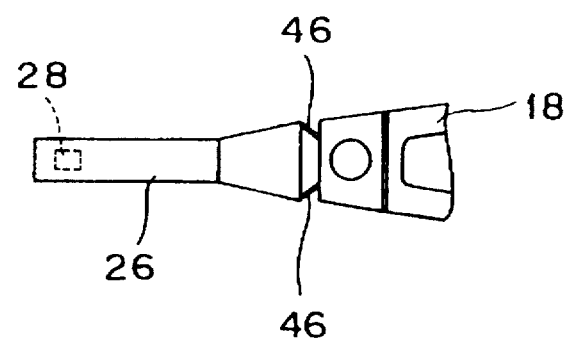
FIG. 17A is a plan view of a fifth preferred embodiment of the present invention.
Figure 17B:
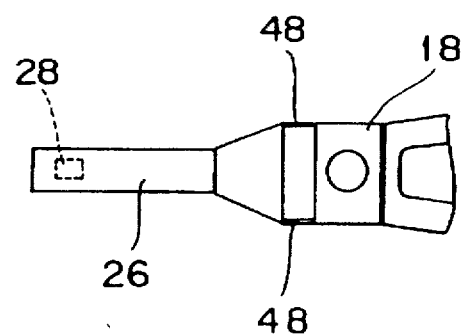
FIG. 17B is a plan view of a sixth preferred embodiment of the present invention.

The cross-shaped leaf spring may be replaced by a pair of leaf springs 46 as shown in FIG. 17A to support the lead beam 26 (a fifth preferred embodiment of the present invention), or by a pair of parallel leaf springs 48 as shown in FIG. 17B to support the load beam 26 (a sixth preferred embodiment of the present invention). In each of these cases, a coil or a magnet as a movable element of an electromagnetic motor must be located on the slider 28 side with respect to the leaf spring 46 or 48.

Figure 18:
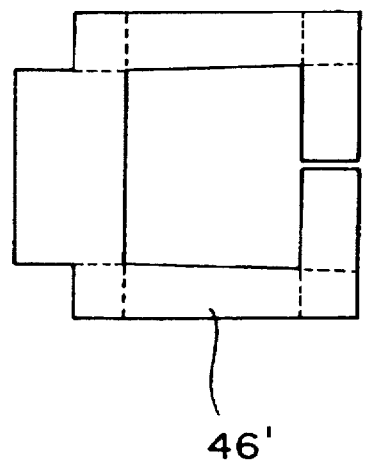
FIG. 18 is a developed plan view of a leaf spring employable in the fifth preferred embodiment.
Figure 19A:
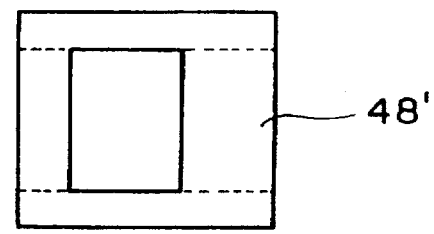
FIG. 19A is a developed plan view of a leaf spring employable in the sixth preferred embodiment.
Figure 19B:
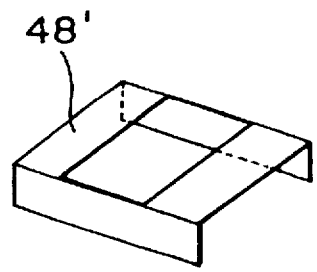
FIG. 19B is a perspective view of the leaf spring shown in FIG. 19A in its bent condition.

The pair of leaf springs 46 shown in FIG. 17A may be replaced by a single leaf spring 46' shown in FIG. 18. The single leaf spring 46' is formed by bending a substantially C-shaped plate along the broken lines shown in FIG. 18. Similarly, the pair of parallel leaf springs 48 shown in FIG. 17B may be replaced by a single leaf spring 48' shown in FIGS. 19A and 19B. The single leaf spring 48' is formed by bending a substantially O-shaped plate along the broken lines shown in FIG. 19A.

Referring to FIG. 20, there is shown a schematic plan view of a seventh preferred embodiment of the present invention. In this preferred embodiment, a pair of leaf springs 50 and 52 crossing each other are used to support the load beam 26. As shown in FIG. 21, the leaf springs 50 and 52 are formed with slits 50a and 50b, respectively. These slits 50a and 50b are engaged together to cross the leaf springs 50 and 52. Also in this preferred embodiment, a coil or a magnet as a movable element of an electromagnetic motor must be located on the slider 28 side with respect to the pair of leaf springs 50 and 52 crossing each other.

Figure 22A:
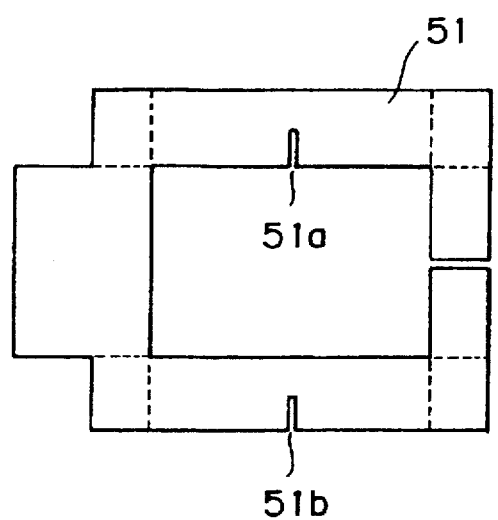
FIG. 22A is a developed plan view of a single leaf spring having a pair of crossing portions.
Figure 22B:
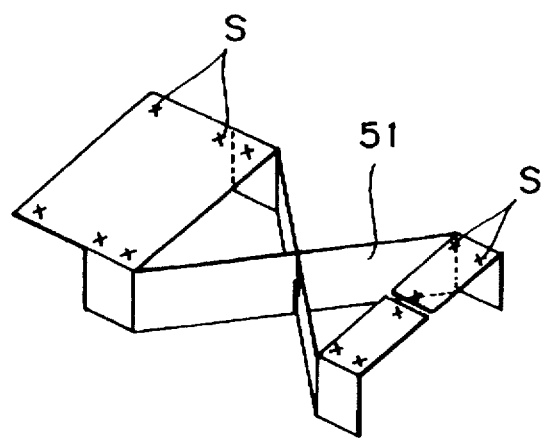
FIG. 22B is a perspective view of the single leaf spring shown in FIG. 22A in its bent condition.

The pair of leaf springs 50 and 52 shown in FIG. 21 may be replaced by a single leaf spring 51 as shown in FIGS. 22A and 22B. The single leaf spring 51 is formed by bending a substantially C-shaped plate along the broken line shown in FIG. 22A. The leaf spring 51 has two slits 51a and 51b as shown in FIG. 22A, and these slits 51a and 51b are engaged together to form a cross-shape as shown in FIG. 22B. The leaf spring 51 is spot-welded at a plurality of points S shown in FIG. 22B to the spacer of the load beam and the spacer of the actuator arm.

Figure 23:
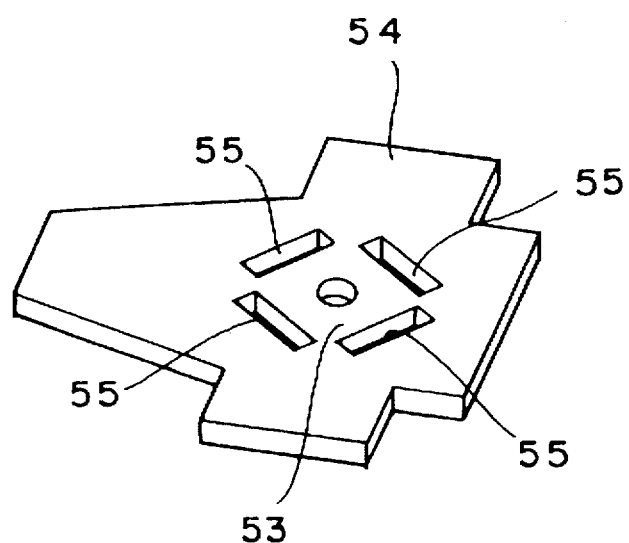
FIG. 23 is a perspective view of a leaf spring formed of resin.

While the leaf spring in each of the above preferred embodiments is formed from a stainless steel plate, a leaf spring 54 formed of resin as shown in FIG. 23 may be used. The leaf spring 54 has a central fixed portion 53 and four slits 55 formed so as to surround the central fixed portion 53. By the use of the resin leaf spring 54, a moment of inertia of the load beam assembly can be reduced.

Figure 24:
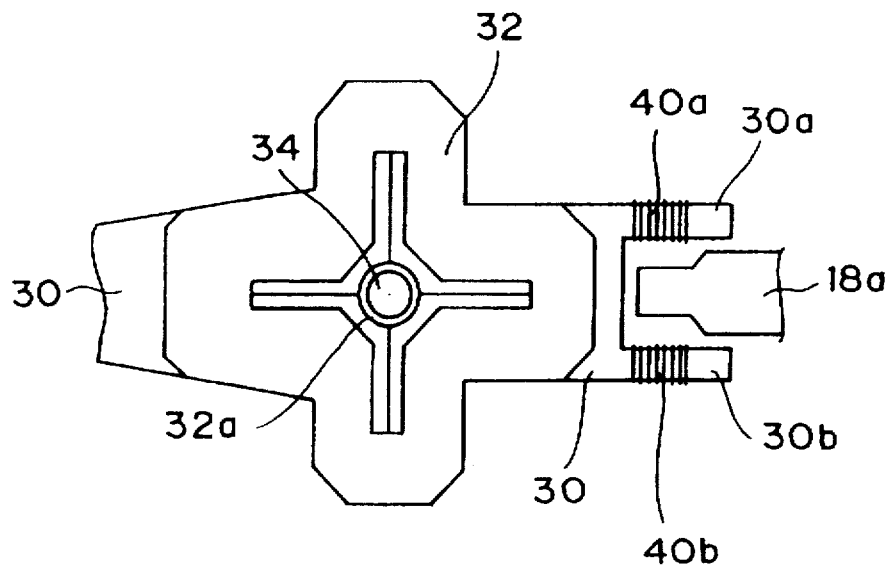
FIG. 24 is a plan view of an eighth preferred embodiment of the present invention.

Referring to FIG. 24, there is shown a plan view of an eighth preferred embodiment of the present invention. In this preferred embodiment, a soft magnetic member 18a is fixed to the actuator arm 18. The spacer 30 is formed of a soft magnetic material. The spacer 30 is integrally formed with a pair of projections 30a, around which coils 40a and 40b are wound. In this preferred embodiment, the electromagnetic motor for generating a driving force is of a magnetic attraction type that does not require a permanent magnet. Accordingly, the count of parts of the electromagnetic motor can be reduced. When the coils 40a and 40b are selectively energized, the spacer 30 is swung about the axis of the shaft 34.

Figure 25:
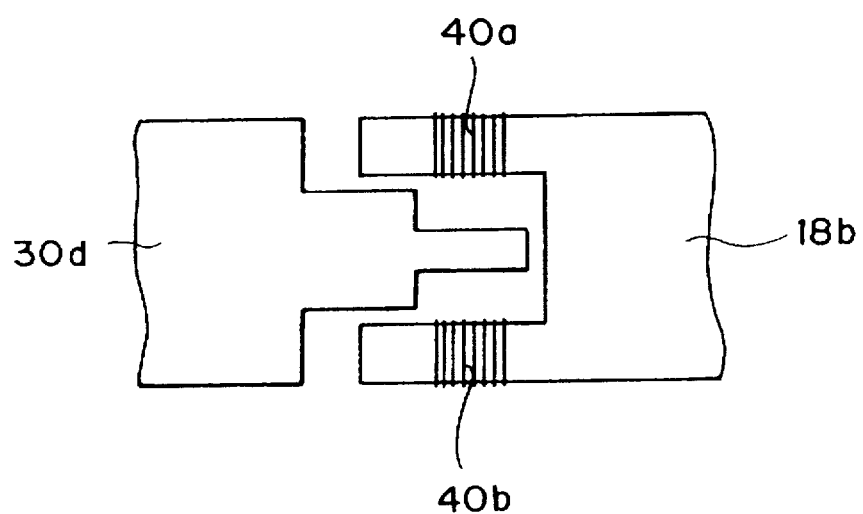
FIG. 25 is a plan view of a ninth preferred embodiment of the present invention.

Referring to FIG. 25, there is shown a plan view of a ninth preferred embodiment of the present invention. In this preferred embodiment, a U-shaped soft magnetic member 18b is fixed to the actuator arm 18, and coils 40a and 40b are wound around the soft magnetic member 18b. At least a rear end portion 30d of the spacer 30 is formed of a soft magnetic material, and is inserted between the coils 40a and 40b.

Figure 26:
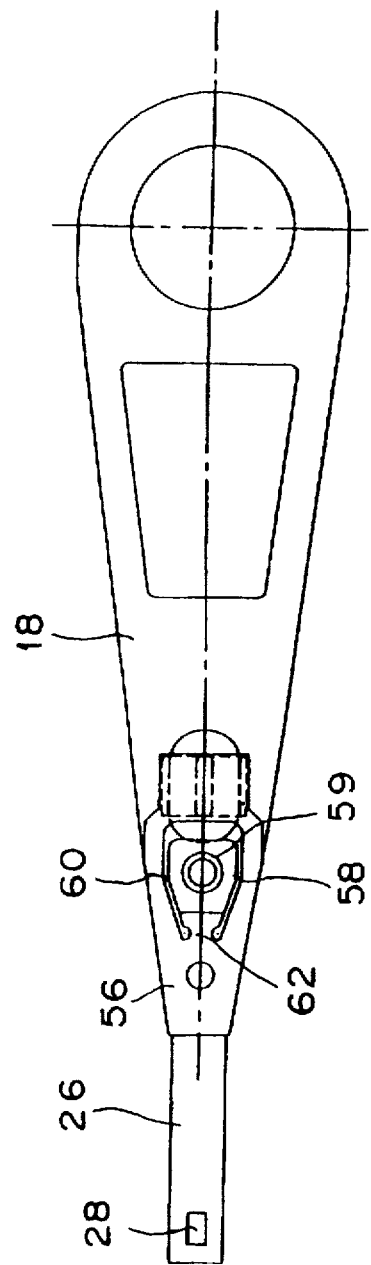
FIG. 26 is a plan view of a tenth preferred embodiment of the present invention.
Figure 27:
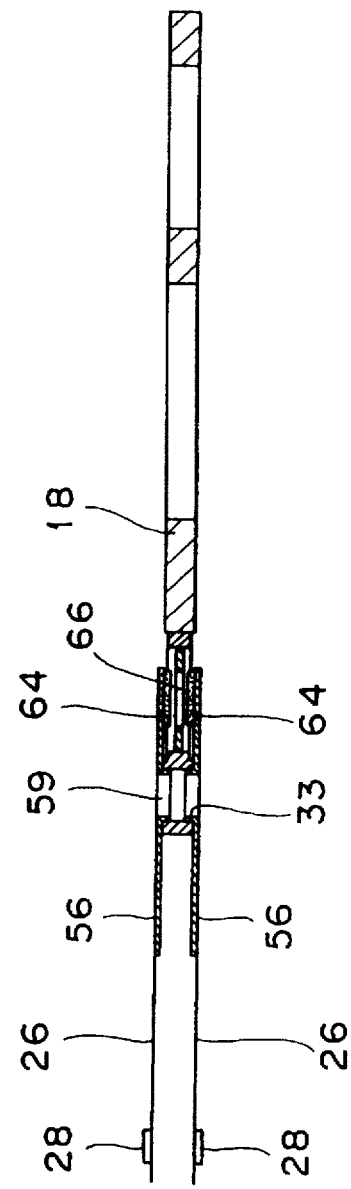
FIG. 27 is a sectional view of the tenth preferred embodiment.
Figure 28:
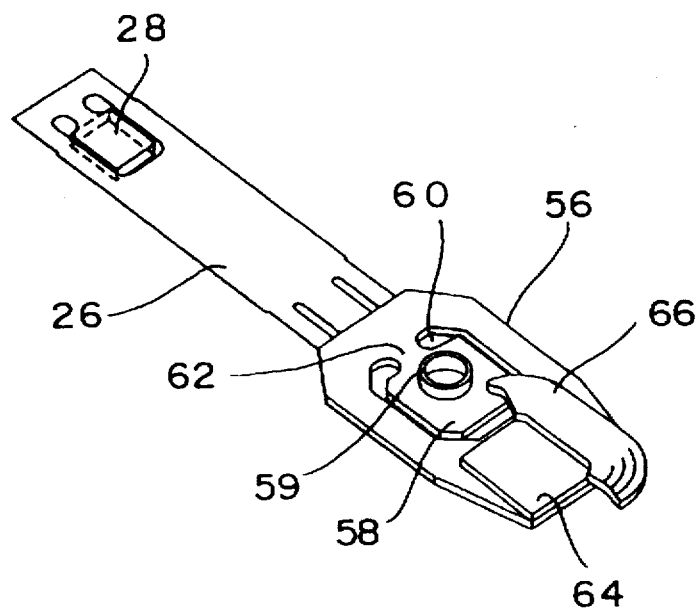
FIG. 28 is a perspective view of the tenth preferred embodiment with an actuator arm omitted.

Referring to FIGS. 26 to 28, there is shown a tenth preferred embodiment of the present invention. As best shown in FIG. 28, a spacer 56 has a central fixed portion 58 formed with an annular projection 59. A C-shaped slit 60 is formed around the central fixed portion 58, and a hinge portion 62 is formed between the opposed ends of the C-shaped slit 60. The spacer 56 is fixed to a base end portion of the load beam 26. A permanent magnet 64 is fixed on the spacer 56 by bonding or the like. Preferably, the permanent magnet 64 is magnetized to have two poles. Reference numeral 66 denotes a coil with an iron core mounted on the actuator arm 18 so as to be opposed to the magnet 64.

The projection 59 formed at the fixed portion 58 of the spacer 56 is inserted into the hole 33 formed at a front end portion of the actuator arm 18, and is crimped to the actuator arm 18, thereby mounting the load beam assembly to the actuator arm 18. When the coil 66 with the iron core mounted on the actuator arm 18 is energized, the load beam 26 is swung about the hinge portion 62. In this preferred embodiment, no leaf spring is used, so that the count of parts and the count of assembly steps can be reduced.

Figure 29:
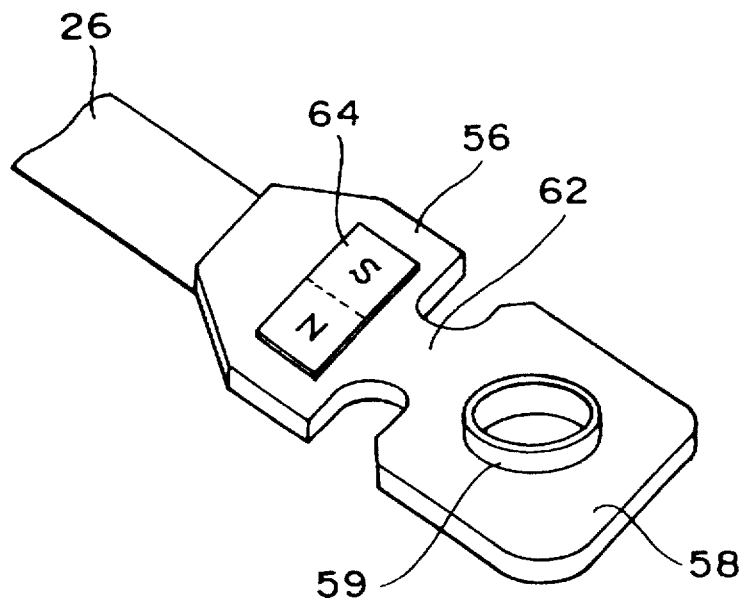
FIG. 29 is a partially cutaway, perspective view of an eleventh preferred embodiment of the present invention.
Figure 30:
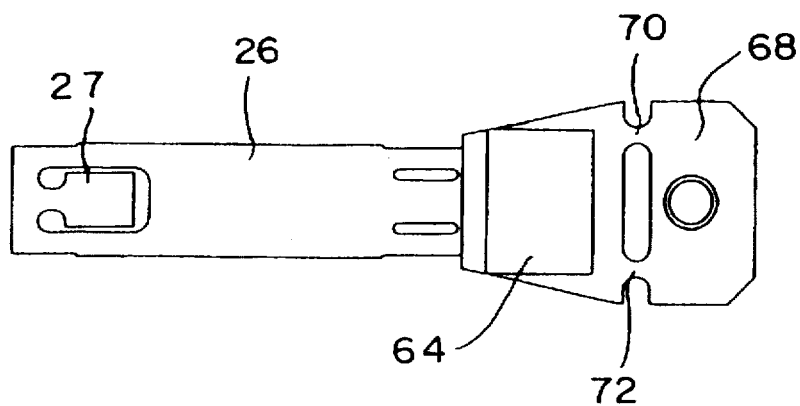
FIG. 30 is a plan view of a twelfth preferred embodiment of the present invention.

As a modification as shown in FIG. 29 (an eleventh preferred embodiment of the present invention), a magnet 64 may be located on the slider 28 side with respect to the hinge portion 62 (the center of rotation of the load beam assembly). With this configuration, an excitation point and a response point can be connected together more rigidly over the tenth preferred embodiment, thereby achieving a more preferable result from a vibrational point of view. As another modification as shown in FIG. 30 (a twelfth preferred embodiment of the present invention), two hinge portions 70 and 72 may be formed in a spacer 68 to support the load beam 26. By the use of the two hinge portions 70 and 72, the torsional rigidity of the spacer 68 can be increased to obtain a structure superior in vibrational characteristics.

Figure 31:
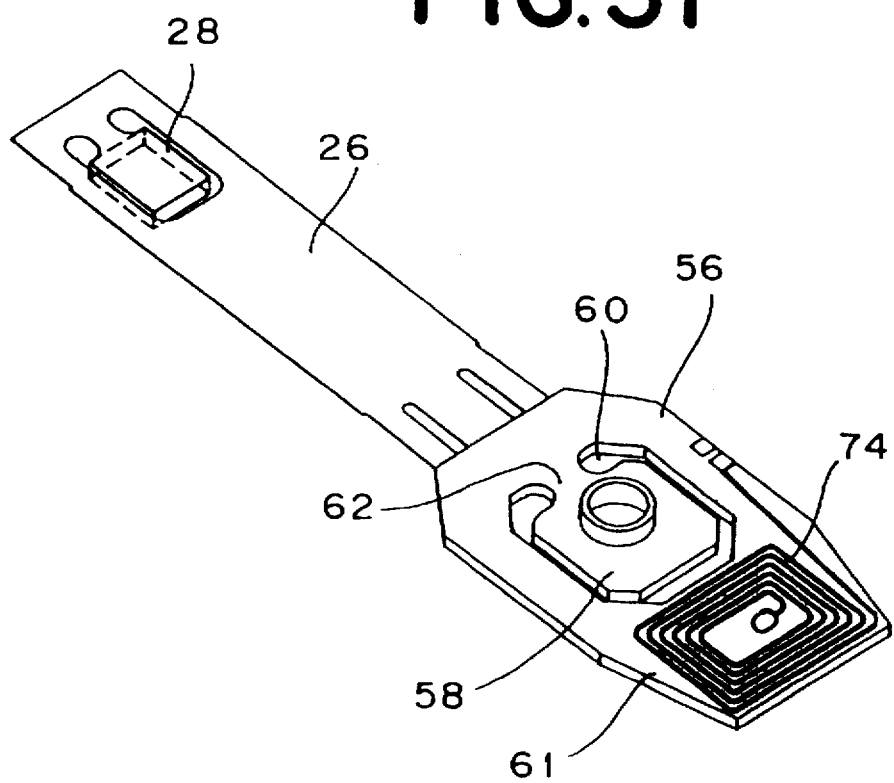
FIG. 31 is a perspective view of a thirteenth preferred embodiment of the present invention.

Referring to FIG. 31, there is shown a perspective view of a thirteenth preferred embodiment of the present invention. In this preferred embodiment, a coil 74 is formed on a movable portion 61 of the spacer 56 by photolithography. A permanent magnet is mounted on the actuator arm 18 so as to be opposed to the coil 74.

Figure 32:
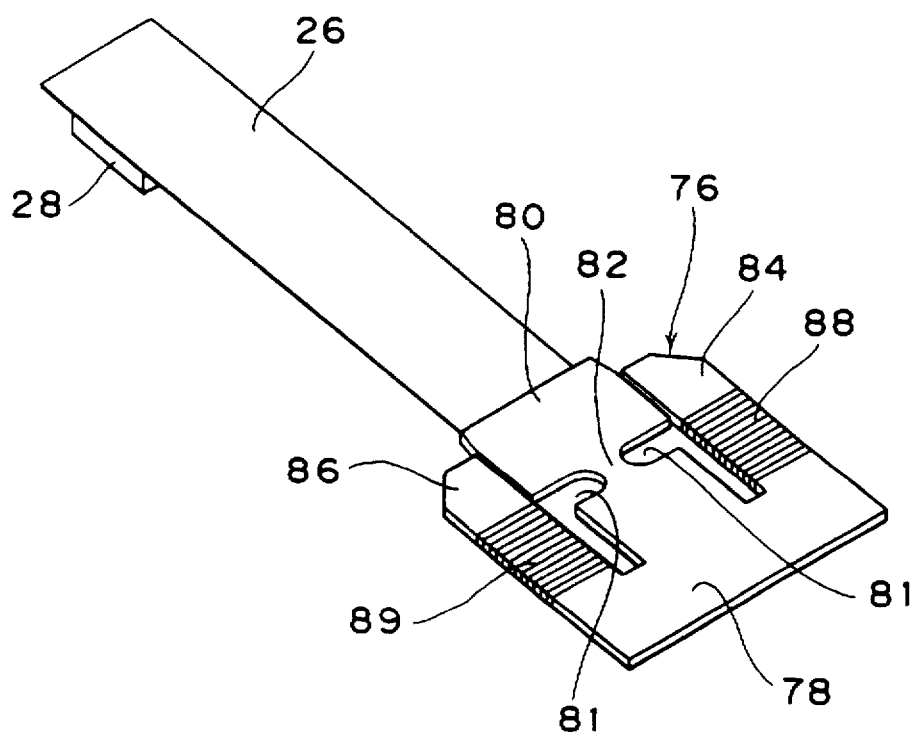
FIG. 32 is a perspective view of a fourteenth preferred embodiment of the present invention.

Referring to FIG. 32, there is shown a perspective view of a fourteenth preferred embodiment of the present invention. In this preferred embodiment, a spacer 76 formed of a soft magnetic material is used. The spacer 76 is fixed at its rear end portion 78 to the front end portion of the actuator arm 18. A movable portion 80 of the spacer 76 is fixed to the base end portion of the load beam 26. A hinge portion 82 is formed between the fixed portion 78 and the movable portion 80 by a pair of L-shaped slits 81. A pair of cores 84 and 86 integral with the fixed portion 78 are formed on the opposite sides of the movable portion 80 with a given spacing defined between each core and the movable portion 80. Coils 88 and 89 are wound around the cores 84 and 86, respectively.

In this preferred embodiment, the electromagnetic motor for generating a driving force is of a magnetic attraction type that does not require a permanent magnet. Accordingly, the count of parts of the electromagnetic motor can be reduced. When the coils 88 and 89 are selectively energized, the load beam 26 is swung about the hinge portion 82. In this preferred embodiment, however, the driving force to a current supplied to the coil 88 or 89 is nonlinear, so that it is difficult to obtain a large swinging range of the load beam 26.

Figure 33:
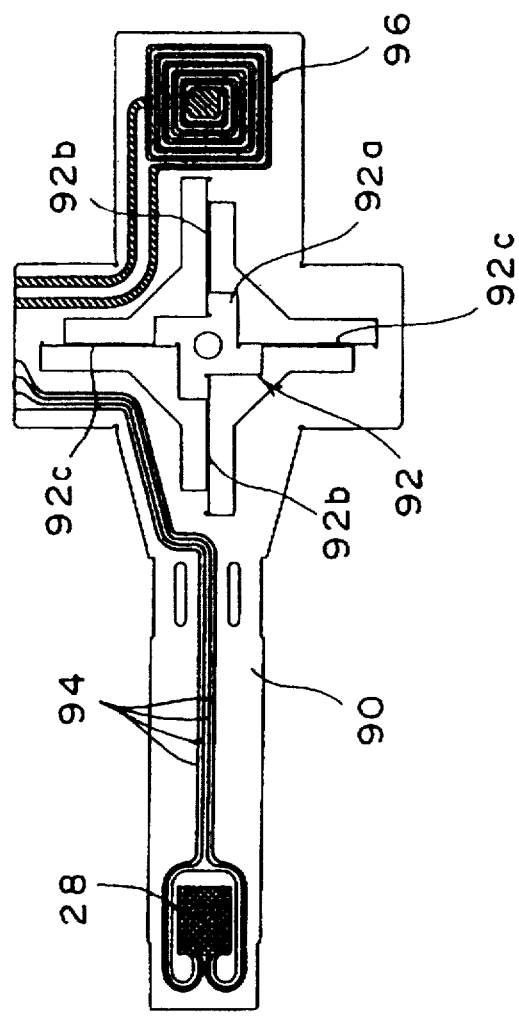
FIG. 33 is a plan view of a fifteenth preferred embodiment of the present invention.
Figure 34:
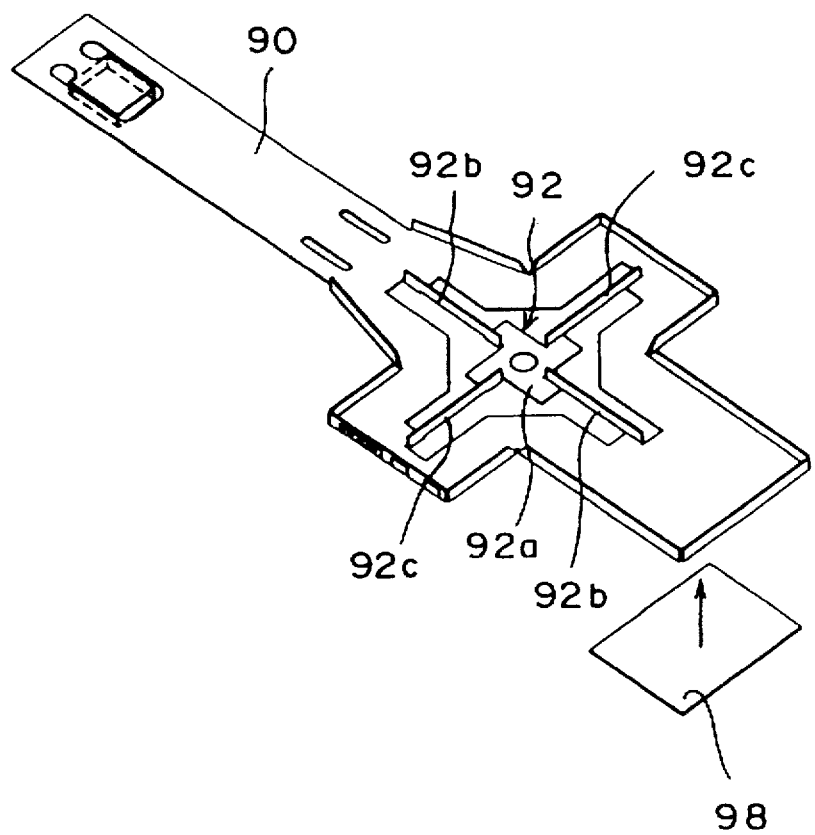
FIG. 34 is a perspective view from the back side of the fifteenth preferred embodiment.

Referring to FIGS. 33 and 34, there are shown a plan view and a perspective view from the back side, respectively, of a fifteenth preferred embodiment of the present invention. In this preferred embodiment, a load beam 90 and a cross-shaped leaf spring 92 are integrally formed together. Like the first preferred embodiment, the cross-shaped leaf spring 92 includes a central fixed portion 92a, a pair of arms 92b extending from the central fixed portion 92a in a longitudinal direction of the load beam 90, and a pair of arms 92c extending from the central fixed portion 92a in a direction perpendicular to the arms 92b.

Four wiring patterns 94 are formed on the load beam 90 by photolithography. Each wiring pattern 94 is connected at its one end to a terminal of a magnetic head element (transducer) mounted on the slider 28. A coil 96 is formed by photolithography on the same surface of the load beam 90 as the surface on which the wiring patterns 94 are formed. As shown in FIG. 34, a soft magnetic member 98 is bonded on the coil 96. The soft magnetic member 98 functions as a yoke. It is sufficient that the thickness of the soft magnetic member 98 is set to about 0.1 mm even in consideration of magnetic saturation. According to this preferred embodiment, the count of parts can be reduced, and the manufacturing steps can be simplified.

Figure 35:
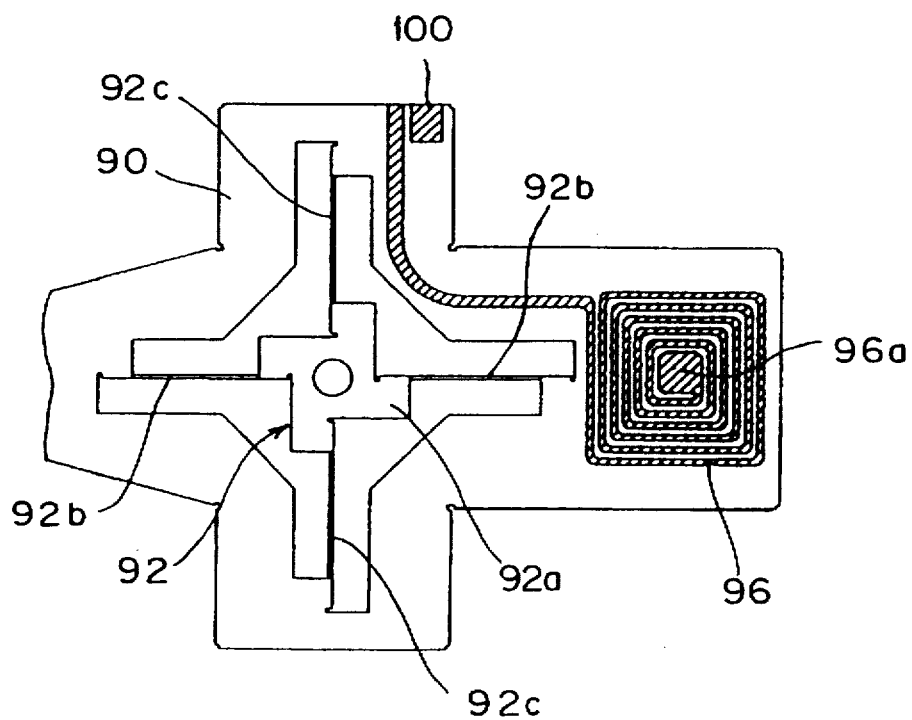
FIG. 35 is a partially cutaway, plan view of a sixteenth preferred embodiment of the present invention.

Referring to FIG. 35, there is shown a plan view of a sixteenth preferred embodiment of the present invention. In this preferred embodiment, a central terminal 96a of the coil 96 and a spring member, i.e., the load beam 90 are electrically connected together. Accordingly, the central terminal 96a of the coil 96 can be connected to a terminal 100. In the preferred embodiment shown in FIG. 33, the pattern of the coil 96 must be formed as two layers with an insulating layer interposed therebetween. In contrast, this preferred embodiment shown in FIG. 35 has an advantage such that the pattern of the coil 96 is formed as one layer, thereby greatly reducing the count of forming steps for the coil 96.

Figure 36:
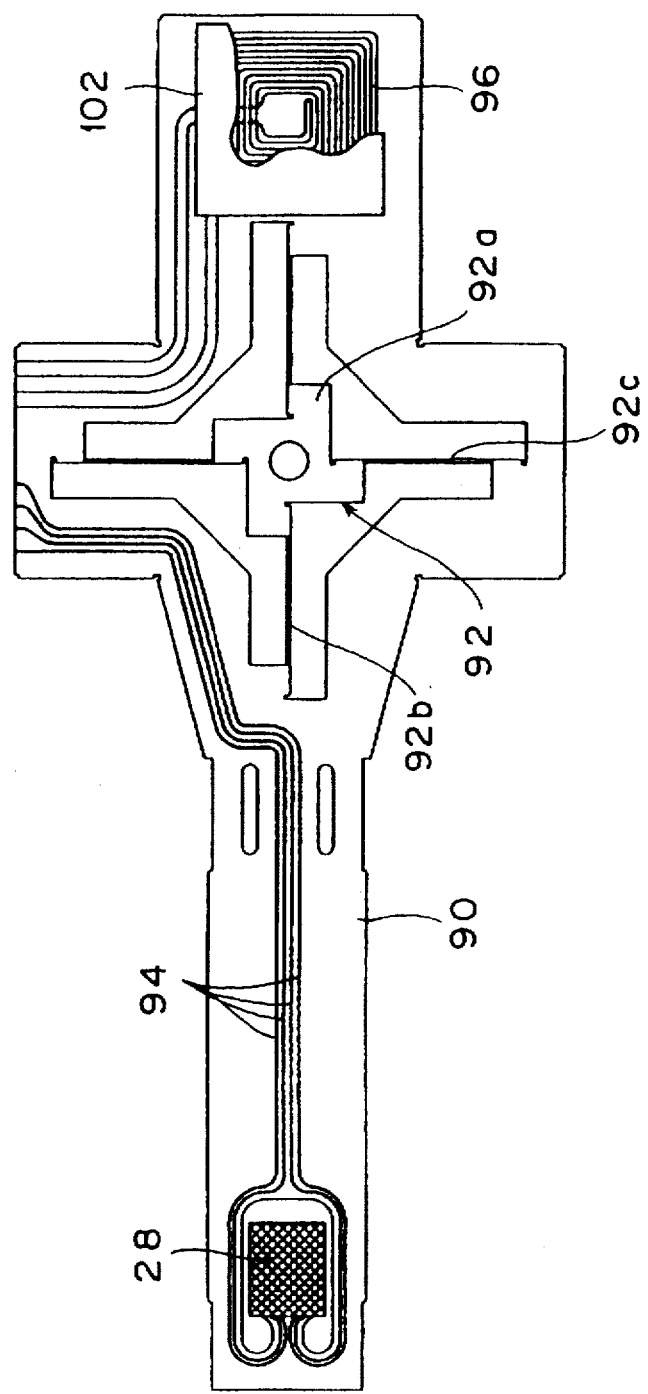
FIG. 36 is a plan view of a seventeenth preferred embodiment of the present invention.
Figure 37:
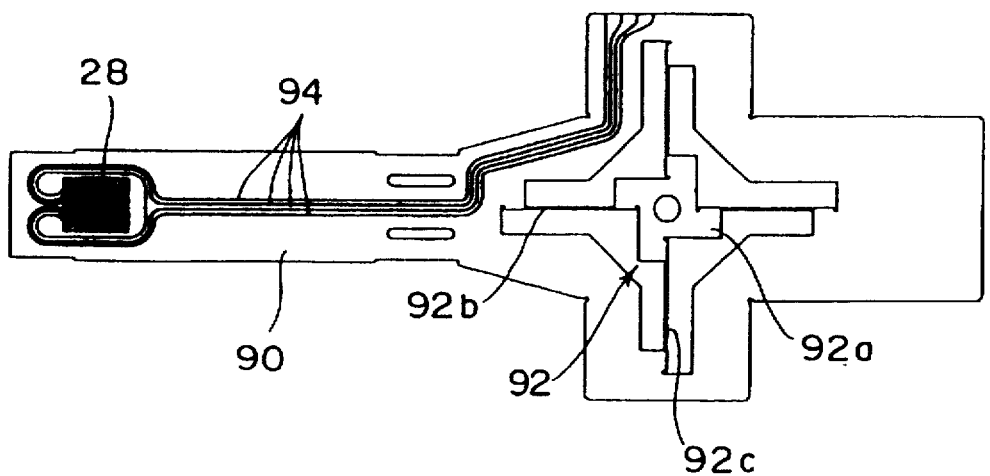
FIG. 37 is a plan view of an eighteenth preferred embodiment of the present invention.
Figure 38:
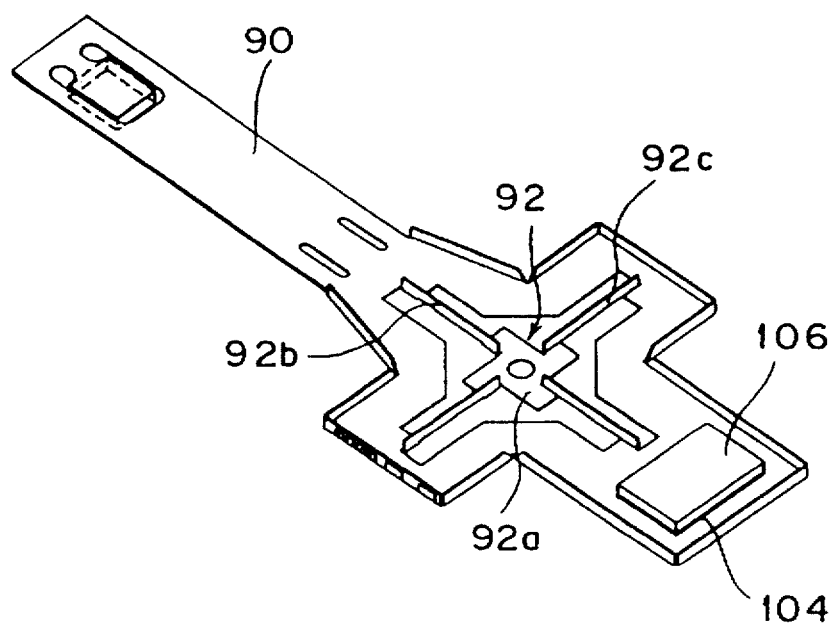
FIG. 38 is a perspective view from the back side of the eighteenth preferred embodiment.

Referring to FIG. 36, there is shown a plan view of a seventeenth preferred embodiment of the present invention. In this preferred embodiment, a soft magnetic member 102 is formed directly on the coil 96 by photolithography (film forming technique). FIGS. 37 and 38 show a plan view and a perspective view from the back side, respectively, of an eighteenth preferred embodiment of the present invention. As shown in FIG. 38, a magnet 106 rather than a coil is mounted on the back surface of the load beam 90 at its base end portion. Preferably, a soft magnetic member 104 as a yoke is located between the magnet 106 and the load beam 90. Preferably, the magnet 106 is magnetized to have two poles. In this case, a coil is mounted on the actuator arm, so that lead wires connected to the coil can be easily routed.

Figure 39:
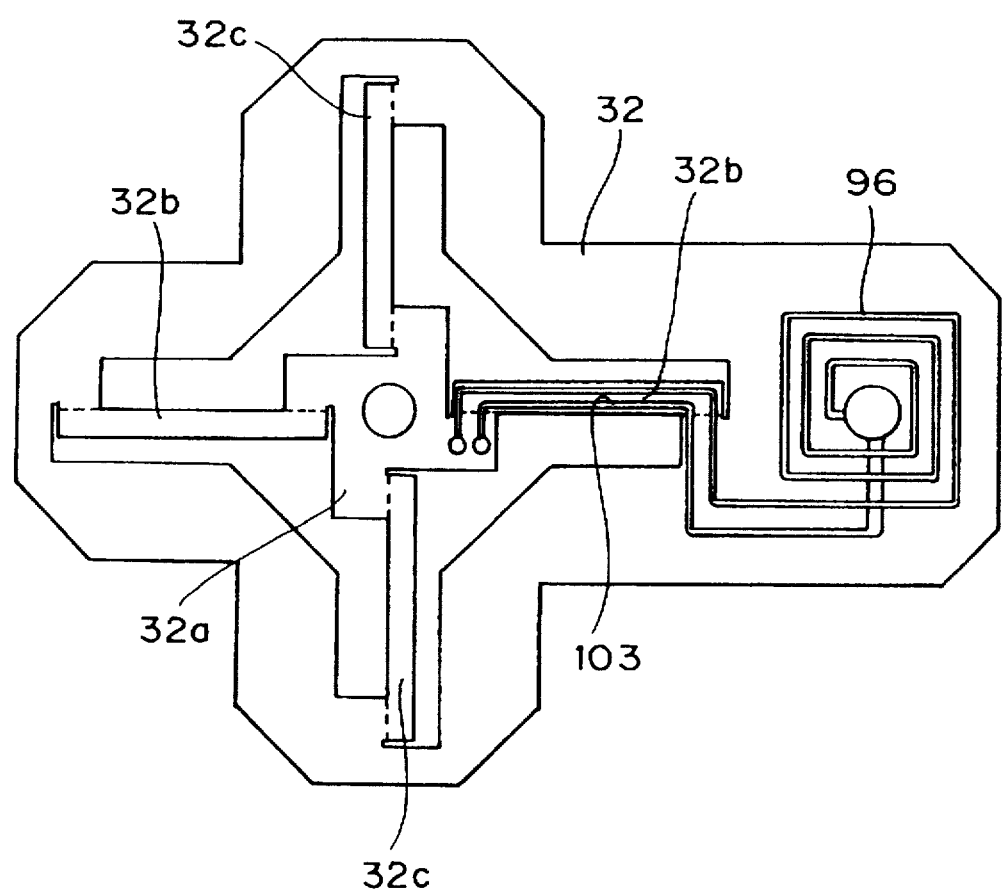
FIG. 39 is a plan view of a nineteenth preferred embodiment of the present invention.

Referring to FIG. 39, there is shown a plan view of a nineteenth preferred embodiment of the present invention. In this preferred embodiment, the coil 96 is formed on the cross-shaped leaf spring 32 shown in FIG. 8 by photolithography. A conductor pattern 103 connected to the coil 96 is formed on the arm 32b of the leaf spring 32.

Figure 40:
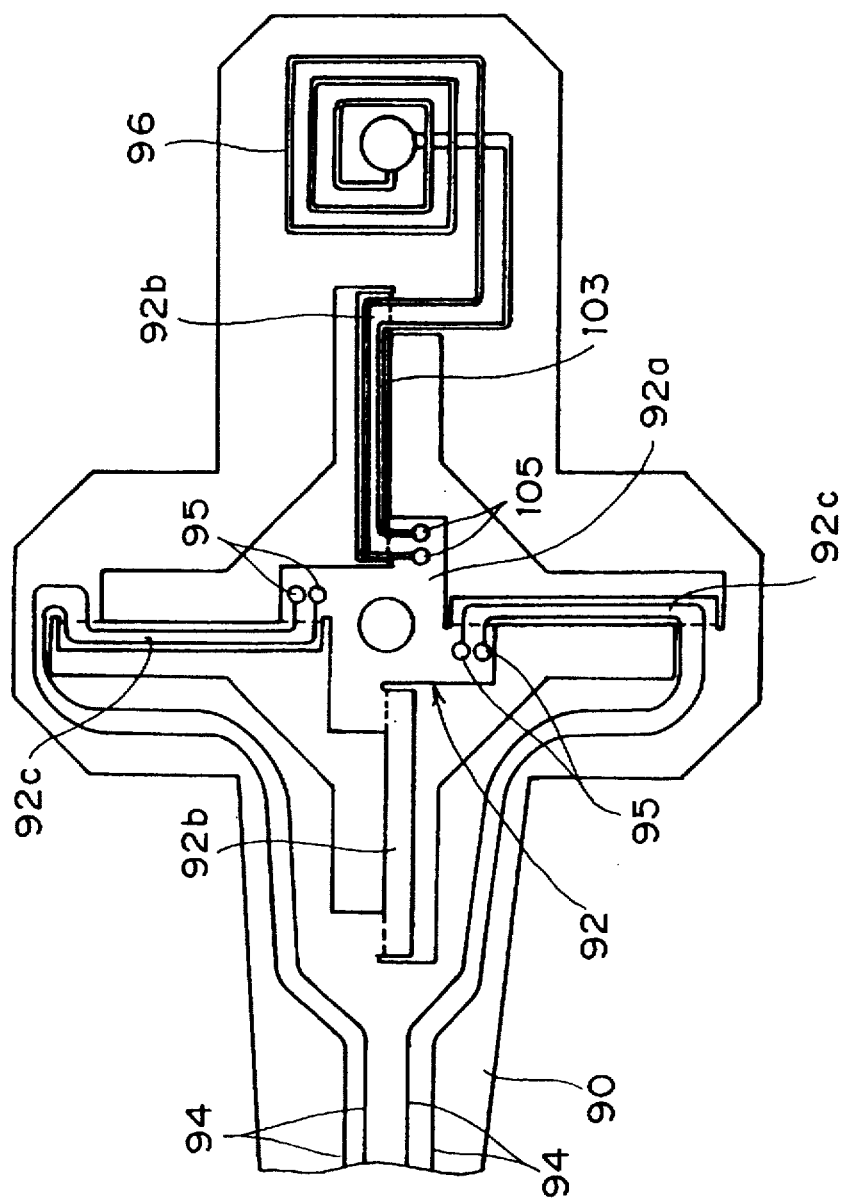
FIG. 40 is a plan view of a twentieth preferred embodiment of the present invention.

Referring to FIG. 40, there is shown a plan view of a twentieth preferred embodiment of the present invention. In this preferred embodiment, the wiring patterns 94 formed on the load beam 90 extend on the arms 92c of the cross-shaped leaf spring 92, and the conductor pattern 103 connected to the coil 96 is formed on the arm 92b. A plurality of terminals 95 and 105 are formed on the central fixed portion 92a of the leaf spring 92.

Figure 41:
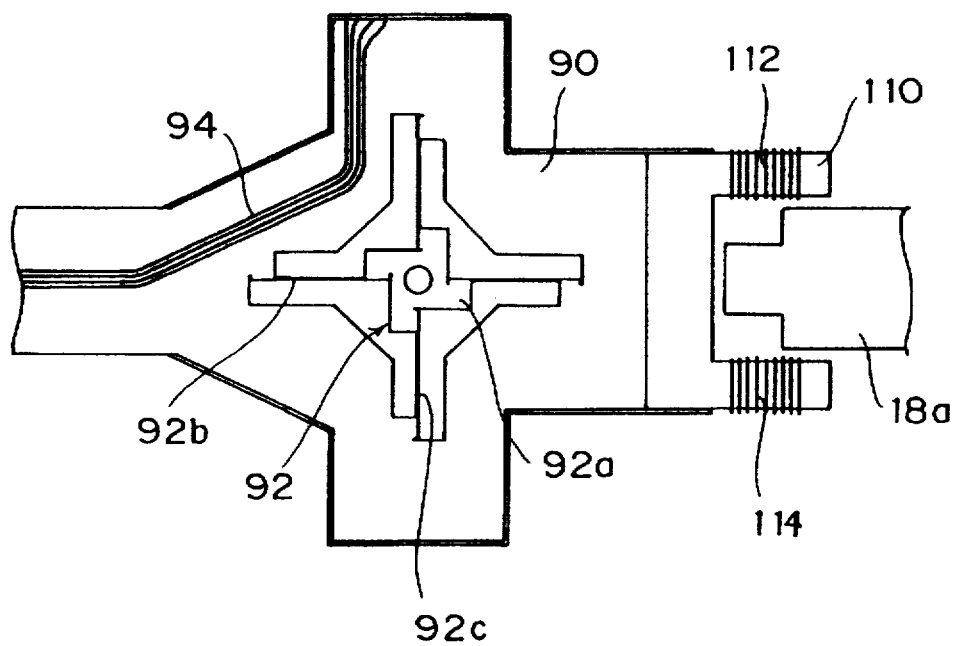
FIG. 41 is a plan view of a twenty-first preferred embodiment of the present invention.

Referring to FIG. 41, there is shown a plan view of a twenty-first preferred embodiment of the present invention. In this preferred embodiment, a U-shaped magnetic member 110 is fixed to the rear end of the load beam 90, and coils 112 and 114 are wound around the U-shaped magnetic member 110. A magnetic member 18a fixed to the actuator arm 18 is inserted between the coils 112 and 114. In this preferred embodiment, the electromagnetic motor for generating a driving force is of a magnetic attraction type like the eighth preferred embodiment shown in FIG. 24.

According to the present invention, the servo bandwidth of the dual stage actuator constructed by an electromagnetic motor can be greatly enlarged over the prior art, thereby remarkably improving a head positioning accuracy. Furthermore, the relation between current and force in the second driving means is linear, so that the second wiring means can be easily controlled in a wide movable range.

What is claimed is:

1. A head actuator in a disk drive having a base, comprising:
    an actuator arm rotatably mounted on said base;
    a first driving means for rotating said actuator arm;
    a load beam for supporting at a front end portion thereof a slider carrying a head;
    a connecting means for elastically connecting a front end portion of said actuator arm and a base end portion of said load beam; and
    a second driving means for swinging said load beam with respect to said actuator arm.

2. A head actuator according to claim 1, wherein said connecting means comprises a leaf spring structure.

3. A head actuator according to claim 2, wherein said leaf spring structure comprises a central portion fixed to said actuator arm, a first arm extending from said central portion in a longitudinal direction of said load beam, and a second arm extending from said central portion in a direction substantially perpendicular to said first arm.

4. A head actuator according to claim 3, wherein said first and second arms are bent at substantially right angles to a plane of swing of said load beam.

5. A head actuator according to claim 2, wherein said leaf spring structure comprises first and second leaf spring members spaced from each other so that surfaces of said first and second leaf spring members are substantially perpendicular to a plane of swing of said load beam.

6. A head actuator according to claim 2, wherein said leaf spring structure comprises first and second leaf spring members crossed each other so that surfaces of said first and second leaf spring members are substantially perpendicular to a plane of swing of said load beam.

7. A head actuator according to claim 2, wherein said second driving means includes a stator fixed to said actuator arm.

8. A head actuator according to claim 1, wherein said connecting means comprises a spacer fixed to said load beam and a leaf spring structure fixed to said spacer.

9. A head actuator according to claim 8, wherein said leaf spring structure comprises a central portion fixed to said actuator arm, a first arm extending from said central portion in a longitudinal direction of said load beam, and a second arm extending from said central portion in a direction substantially perpendicular to said first arm.

10. A head actuator according to claim 9, wherein said second driving means comprises a permanent magnet fixed to said actuator arm, and a coil formed on said spacer so as to be opposed to said permanent magnet with a gap defined therebetween.

11. A head actuator according to claim 10, wherein said coil is formed by photolithography on said leaf spring structure mounted on said spacer.

12. A head actuator according to claim 11, further comprising a lead pattern connected to said coil and formed on one of said first arm and said second arm.

13. A head actuator according to claim 8, wherein said second driving means comprises a permanent magnet fixed to said spacer, and a coil mounted on said actuator arm so as to be opposed to said permanent magnet with a gap defined therebetween.

14. A head actuator according to claim 8, wherein said second driving means comprises a U-shaped, first magnetic member fixed to an end portion of said spacer, a pair of coils wound around said first magnetic member, and a second magnetic member fixed to said actuator arm and inserted between said pair of coils.

15. A head actuator according to claim 8, wherein said second driving means comprises a U-shaped, first magnetic member fixed to said actuator arm, a pair of coils wound around said first magnetic member, and a second magnetic member fixed to said spacer and inserted between said pair of coils.

16. A head actuator according to claim 1, wherein a center of swing of said load beam substantially coincides with a center of gravity of a movable structure comprising said load beam, said slider, and said connecting means.

17. A head actuator according to claim 1, wherein said connecting means comprises a spacer, said spacer including a first portion fixed to said actuator arm, a second portion fixed to said load beam, and a hinge portion formed between said first and second portions.

18. A head actuator according to claim 17, wherein said second driving means comprises a permanent magnet fixed to said actuator arm, and a coil mounted on said spacer so as to be opposed to said permanent magnet with a gap defined therebetween.

19. A head actuator according to claim 17, wherein said second driving means comprises a permanent magnet fixed to said spacer, and a coil mounted on said actuator arm so as to be opposed to said permanent magnet with a gap defined therebetween.

20. A head actuator according to claim 17, wherein said second driving means includes a stator fixed to said actuator arm.

21. A head actuator according to claim 1, wherein:
    said connecting means comprises a spacer, said spacer including a fixed portion fixed to said actuator arm, a movable portion formed integrally with said fixed portion and fixed to said load beam, and a hinge portion formed between said fixed portion and said movable portion;
    said spacer is formed of a soft magnetic material;
    said fixed portion has a pair of cores extending in a longitudinal direction of said load beam so as to be opposed to said movable portion with a gap defined therebetween; and
    a coil is wound around each of said cores.

22. A head actuator in a disk drive having a base, comprising:
    an actuator arm rotatably mounted on said base;
    a first driving means for rotating said actuator arm;
    a load beam for supporting at a front end portion thereof a slider carrying a head, said load beam having an integrally formed connecting member elastically connected to a front end portion of said actuator arm; and a second driving means for swinging said load beam with respect to said actuator arm.

23. A head actuator according to claim 22, wherein said connecting member comprises a leaf spring including a central portion fixed to said actuator arm, a first arm extending from said central portion in a longitudinal direction of said load beam, and a second arm extending from said central portion in a direction substantially perpendicular to said first arm.

24. A head actuator according to claim 23, wherein said first and second arms are bent at substantially right angles to a plane of swing of said load beam.

25. A head actuator according to claim 23, further comprising a plurality of wiring patterns formed on said load beam through an insulating film, each of said wiring patterns having one end connected to said head, and a lead pattern formed on at least one of said first arm and said second arm and connected to said wiring patterns.

26. A head actuator according to claim 22, further comprising a plurality of wiring patterns formed on said load beam through an insulating film, each of said wiring patterns having one end connected to said head.

27. A head actuator according to claim 26, wherein said second driving means comprises a permanent magnet fixed to said actuator arm, a coil formed on said load beam so as to be opposed to said permanent magnet with a gap defined therebetween, and a yoke formed on said coil.

28. A head actuator according to claim 27, wherein said coil has a central terminal electrically connected to said load beam.

29. A head actuator according to claim 27, wherein said coil and said yoke are formed by photolithography.

30. A head actuator according to claim 29, further comprising a lead pattern connected to said coil and formed on one of said first arm and said second arm.

31. A head actuator according to claim 26, wherein said second driving means comprises a permanent magnet fixed to said load beam, and a coil mounted on said actuator arm so as to be opposed to said permanent magnet with a gap defined therebetween.

32. A head actuator according to claim 22, wherein said second driving means comprises a U-shaped, first magnetic member fixed to an end portion of said load beam, a pair of coils wound around said first magnetic member, and a second magnetic member fixed to said actuator arm and inserted between said pair of coils.

33. A head actuator according to claim 22, wherein said second driving means comprises a U-shaped, first magnetic member fixed to said actuator arm, a pair of coils wound around said first magnetic member, and a second magnetic member fixed to an end portion of said load beam and inserted between said pair of coils.

* * * * *